United States Patent
Karafin et al.

(10) Patent No.: US 11,719,864 B2
(45) Date of Patent: Aug. 8, 2023

(54) ORDERED GEOMETRIES FOR OPTOMIZED HOLOGRAPHIC PROJECTION

(71) Applicant: Light Field Lab, Inc., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 16/962,193

(22) PCT Filed: Jan. 14, 2019

(86) PCT No.: PCT/US2019/013556
§ 371 (c)(1),
(2) Date: Jul. 14, 2020

(87) PCT Pub. No.: WO2019/140416
PCT Pub. Date: Jul. 18, 2019

(65) Prior Publication Data
US 2021/0063766 A1    Mar. 4, 2021

Related U.S. Application Data

(60) Provisional application No. 62/617,293, filed on Jan. 14, 2018, provisional application No. 62/617,288, filed on Jan. 14, 2018.

(51) Int. Cl.
*G02B 5/02* (2006.01)
*F24V 30/00* (2018.01)
(Continued)

(52) U.S. Cl.
CPC ............ *G02B 5/0242* (2013.01); *F24V 30/00* (2018.05); *G02B 3/0037* (2013.01);
(Continued)

(58) Field of Classification Search
CPC ................ G02B 27/0994; G02B 27/09; G02B 27/0103; G02B 30/56; G02B 30/00;
(Continued)

(56) References Cited

U.S. PATENT DOCUMENTS 3,626,040 A    12/1971 Nagao et al.
4,087,159 A    5/1978 Ulrich
(Continued)

FOREIGN PATENT DOCUMENTS

CN    105637415 A    6/2016
GB    2253070 A    8/1992
(Continued)

OTHER PUBLICATIONS

AU-2017296074 Notice of Acceptance dated Mar. 12, 2020.
(Continued)

*Primary Examiner* — Andrew Jordan
(74) *Attorney, Agent, or Firm* — Charles C. Yang

(57) ABSTRACT

Disclosed are systems for directing energy according to holographic projection. Configurations of waveguide arrays are disclosed for improved efficiency and resolution of propagated energy through tessellation of shaped energy waveguides.

27 Claims, 18 Drawing Sheets

(51) Int. Cl.

| | | |
|---|---|---|
| G02B 30/00 | (2020.01) | |
| G02B 6/04 | (2006.01) | |
| G02B 6/10 | (2006.01) | |
| G02B 27/09 | (2006.01) | |
| G03H 1/02 | (2006.01) | |
| G02B 6/06 | (2006.01) | |
| G02B 27/01 | (2006.01) | |
| G02B 30/56 | (2020.01) | |
| G02B 3/00 | (2006.01) | |
| G02B 3/08 | (2006.01) | |
| G02B 5/32 | (2006.01) | |
| F24S 30/00 | (2018.01) | |

(52) U.S. Cl.
CPC ............ *G02B 3/0056* (2013.01); *G02B 3/08* (2013.01); *G02B 5/0278* (2013.01); *G02B 5/32* (2013.01); *G02B 6/04* (2013.01); *G02B 6/06* (2013.01); *G02B 6/10* (2013.01); *G02B 27/0103* (2013.01); *G02B 27/09* (2013.01); *G02B 27/0994* (2013.01); *G02B 30/00* (2020.01); *G02B 30/56* (2020.01); *G03H 1/02* (2013.01); *F24S 30/00* (2018.05)

(58) Field of Classification Search
CPC .......... G02B 3/0037; G02B 3/08; G02B 6/06; G02B 6/04; G02B 6/10; G02B 5/0242; G02B 5/0278; G02B 5/32; F24V 30/00; G03H 1/02; F24S 30/00; F24S 23/00
See application file for complete search history.

(56) References Cited

U.S. PATENT DOCUMENTS

| | | | |
|---|---|---|---|
| 4,134,642 A | 1/1979 | Kapron et al. | |
| 4,143,234 A | 3/1979 | Johnson et al. | |
| 4,149,772 A | 4/1979 | Iyengar et al. | |
| 4,265,515 A | 5/1981 | Kao et al. | |
| 4,372,769 A | 2/1983 | Hicks, Jr. | |
| 5,004,335 A | 4/1991 | Montes | |
| 5,187,260 A | 2/1993 | Karali et al. | |
| 5,187,360 A | 2/1993 | Pasco | |
| 5,371,826 A | 12/1994 | Friedman | |
| 5,374,976 A | 12/1994 | Spannenburg | |
| 5,396,350 A | 3/1995 | Beeson et al. | |
| 5,451,969 A * | 9/1995 | Toth | H01Q 19/19 343/700 MS |
| 5,519,801 A | 5/1996 | Le Noane et al. | |
| 5,822,125 A | 10/1998 | Meyers | |
| 5,973,844 A * | 10/1999 | Burger | G02B 3/0056 359/622 |
| 5,974,215 A | 10/1999 | Bilbro et al. | |
| 6,041,154 A | 3/2000 | Ono et al. | |
| 6,169,594 B1 | 1/2001 | Aye et al. | |
| 6,381,072 B1 * | 4/2002 | Burger | G02B 3/0056 359/621 |
| 6,384,400 B1 | 5/2002 | Albagli et al. | |
| 6,418,254 B1 | 7/2002 | Shikata et al. | |
| 6,487,351 B1 | 11/2002 | Cryan et al. | |
| 6,611,648 B2 | 8/2003 | Kumar et al. | |
| 6,614,972 B1 | 9/2003 | Lundin | |
| 6,680,761 B1 | 1/2004 | Greene et al. | |
| 7,050,020 B2 | 5/2006 | Uehara et al. | |
| 7,235,047 B2 | 6/2007 | MacAulay et al. | |
| RE39,864 E | 10/2007 | Athale et al. | |
| 7,376,314 B2 | 5/2008 | Reininger | |
| 7,653,279 B1 | 1/2010 | Jacobsen | |
| 7,773,849 B2 | 8/2010 | Shani | |
| 7,986,374 B2 | 7/2011 | Ijzerman et al. | |
| 8,149,265 B2 | 4/2012 | Smalley et al. | |
| 8,308,329 B1 | 11/2012 | Sethna | |
| 8,345,144 B1 | 1/2013 | Georgiev et al. | |
| 8,406,595 B2 | 3/2013 | Hayashi | |
| 8,442,397 B2 | 5/2013 | Kang et al. | |
| 8,477,906 B2 | 7/2013 | Morse et al. | |
| 8,736,675 B1 | 5/2014 | Holzbach et al. | |
| 8,953,012 B2 | 2/2015 | Williams et al. | |
| 8,977,090 B2 | 3/2015 | Lambert et al. | |
| 9,063,289 B1 * | 6/2015 | Farmer | G02B 27/106 |
| 9,143,678 B2 | 9/2015 | Park et al. | |
| 9,179,134 B2 | 11/2015 | Ranieri et al. | |
| 9,188,737 B2 | 11/2015 | Joseph et al. | |
| 9,256,060 B2 | 2/2016 | Kobori et al. | |
| 9,343,020 B2 | 5/2016 | Heide et al. | |
| 9,405,124 B2 | 8/2016 | Hirsch et al. | |
| 9,494,738 B1 | 11/2016 | Farmer et al. | |
| 9,535,217 B1 * | 1/2017 | Farmer | G02B 6/28 |
| 9,692,512 B2 * | 6/2017 | Griffith | H04B 10/2575 |
| 9,817,626 B2 | 11/2017 | Ur et al. | |
| 9,835,812 B2 | 12/2017 | Yadlowsky | |
| 9,874,761 B2 | 1/2018 | Putten et al. | |
| 9,904,065 B2 | 2/2018 | Jin et al. | |
| 9,945,985 B2 | 4/2018 | Morasse | |
| 9,945,988 B2 | 4/2018 | Powell | |
| 10,009,597 B2 | 6/2018 | Karafin et al. | |
| 10,094,974 B2 | 10/2018 | Chen et al. | |
| 10,132,993 B2 | 11/2018 | Buczynski et al. | |
| 10,298,915 B2 | 5/2019 | Huh et al. | |
| 10,363,818 B2 | 7/2019 | Coser et al. | |
| 10,488,584 B2 | 11/2019 | Karafin et al. | |
| 10,551,628 B2 | 2/2020 | Karafin et al. | |
| 2001/0028485 A1 | 10/2001 | Kremen | |
| 2002/0001128 A1 | 1/2002 | Moseley et al. | |
| 2002/0009261 A1 | 1/2002 | Bhagavatula et al. | |
| 2002/0021501 A1 | 2/2002 | Kawashima et al. | |
| 2002/0047893 A1 | 4/2002 | Kremen | |
| 2002/0080484 A1 * | 6/2002 | Moshrefzadeh | G03B 21/625 359/460 |
| 2002/0172478 A1 | 11/2002 | Sahlin | |
| 2003/0026567 A1 | 2/2003 | Cryan et al. | |
| 2003/0030912 A1 | 2/2003 | Gleckman et al. | |
| 2003/0137730 A1 | 7/2003 | Fridman et al. | |
| 2004/0080938 A1 | 4/2004 | Holman et al. | |
| 2004/0108806 A1 | 6/2004 | Cok et al. | |
| 2004/0240777 A1 | 12/2004 | Woodgate et al. | |
| 2005/0093713 A1 | 5/2005 | Orme | |
| 2005/0243275 A1 | 11/2005 | Curatu | |
| 2006/0028400 A1 | 2/2006 | Lapstun et al. | |
| 2006/0077319 A1 | 4/2006 | Kitamura | |
| 2006/0146428 A1 | 7/2006 | Lim et al. | |
| 2006/0165358 A1 | 7/2006 | Trebst et al. | |
| 2006/0191566 A1 | 8/2006 | Schaafsma | |
| 2006/0256415 A1 | 11/2006 | Holmes et al. | |
| 2008/0144174 A1 | 6/2008 | Lucente et al. | |
| 2008/0170293 A1 | 7/2008 | Lucente et al. | |
| 2009/0148098 A1 | 6/2009 | Lewis et al. | |
| 2009/0164397 A1 | 6/2009 | Kwok et al. | |
| 2009/0225380 A1 | 9/2009 | Schwerdtner et al. | |
| 2009/0266992 A1 | 10/2009 | Beekman | |
| 2009/0273538 A1 | 11/2009 | Smith et al. | |
| 2009/0314919 A1 | 12/2009 | Lee et al. | |
| 2010/0245824 A1 | 9/2010 | Schwarz et al. | |
| 2010/0277779 A1 | 11/2010 | Futterer et al. | |
| 2010/0278480 A1 | 11/2010 | Vasylyev | |
| 2010/0289870 A1 | 11/2010 | Leister | |
| 2011/0094269 A1 | 4/2011 | Mukasa | |
| 2011/0114831 A1 | 5/2011 | Grier | |
| 2011/0134040 A1 | 6/2011 | Duparre et al. | |
| 2011/0157180 A1 | 6/2011 | Burger et al. | |
| 2011/0169832 A1 | 7/2011 | Brown et al. | |
| 2011/0242461 A1 | 10/2011 | Escuti et al. | |
| 2011/0254916 A1 | 10/2011 | Fan et al. | |
| 2012/0050833 A1 | 3/2012 | Bove, Jr. et al. | |
| 2012/0224062 A1 | 9/2012 | Lacoste et al. | |
| 2013/0088785 A1 | 4/2013 | Yamamoto | |
| 2013/0140916 A1 | 6/2013 | Dunlap et al. | |
| 2013/0163089 A1 | 6/2013 | Bohn | |
| 2013/0170004 A1 | 7/2013 | Futterer | |
| 2013/0195410 A1 | 8/2013 | Karbasivalashani et al. | |
| 2013/0216123 A1 | 8/2013 | Shroff et al. | |
| 2013/0265485 A1 | 10/2013 | Kang | |
| 2014/0126322 A1 | 5/2014 | Cipolla et al. | |

(56) References Cited

U.S. PATENT DOCUMENTS

| | | | |
|---|---|---|---|
| 2014/0132694 A1 | 5/2014 | Shacham et al. | |
| 2014/0192087 A1 | 7/2014 | Frost | |
| 2014/0300694 A1 | 10/2014 | Smalley et al. | |
| 2014/0300695 A1 | 10/2014 | Smalley et al. | |
| 2014/0320530 A1 | 10/2014 | Gruber et al. | |
| 2014/0358002 A1 | 12/2014 | Daoura | |
| 2014/0371353 A1 | 12/2014 | Mitchell et al. | |
| 2015/0092071 A1 | 4/2015 | Meng et al. | |
| 2015/0212274 A1 | 7/2015 | Kopp et al. | |
| 2015/0241608 A1 | 8/2015 | Shian et al. | |
| 2015/0247976 A1 | 9/2015 | Abovitz et al. | |
| 2015/0285682 A1 | 10/2015 | Popovich et al. | |
| 2015/0378183 A1 | 12/2015 | Pernice et al. | |
| 2016/0036529 A1* | 2/2016 | Griffith | H01Q 5/42 398/116 |
| 2016/0070059 A1 | 3/2016 | Chen et al. | |
| 2016/0091786 A1 | 3/2016 | Kazmierski et al. | |
| 2016/0209657 A1 | 7/2016 | Popovich et al. | |
| 2016/0282808 A1 | 9/2016 | Smalley | |
| 2016/0291328 A1 | 10/2016 | Popovich et al. | |
| 2016/0309065 A1 | 10/2016 | Karafin et al. | |
| 2017/0139213 A1 | 5/2017 | Schmidtlin | |
| 2017/0214907 A1 | 7/2017 | Lapstun | |
| 2017/0248783 A1* | 8/2017 | Gruhlke | G01S 7/4817 |
| 2018/0131926 A1 | 5/2018 | Shanks et al. | |
| 2018/0356591 A1 | 12/2018 | Karafin et al. | |
| 2018/0361680 A1 | 12/2018 | Bharti et al. | |
| 2018/0372926 A1 | 12/2018 | Karafin et al. | |
| 2018/0372958 A1 | 12/2018 | Karafin et al. | |
| 2019/0004228 A1 | 1/2019 | Pevensee et al. | |
| 2019/0004319 A1 | 1/2019 | Karafin et al. | |
| 2019/0004326 A1 | 1/2019 | Karafin et al. | |
| 2019/0011621 A1 | 1/2019 | Karafin et al. | |
| 2019/0064435 A1 | 2/2019 | Karafin et al. | |
| 2020/0249504 A1* | 8/2020 | Hopkin | G02F 1/1323 |
| 2021/0063766 A1* | 3/2021 | Karafin | G02B 3/0037 |

FOREIGN PATENT DOCUMENTS

| | | |
|---|---|---|
| JP | H09304740 A | 11/1997 |
| JP | H10186275 A | 7/1998 |
| JP | H10186276 A | 7/1998 |
| JP | 2000066132 A | 3/2000 |
| JP | 2003524205 A | 8/2003 |
| JP | 2007025601 A | 2/2007 |
| JP | 2009053263 A | 3/2009 |
| JP | 2009053567 A | 3/2009 |
| JP | 2010536069 A | 11/2010 |
| JP | 2012234093 A | 11/2012 |
| TW | 200700695 A | 1/2007 |
| WO | 0106287 A1 | 1/2001 |
| WO | 2005057670 A2 | 6/2005 |
| WO | 2008048360 A2 | 4/2008 |
| WO | 2008093721 A1 | 8/2008 |
| WO | 2012029081 A1 | 3/2012 |
| WO | 2013172233 A1 | 11/2013 |
| WO | 2014002526 A1 | 1/2014 |
| WO | 2016007920 A1 | 1/2016 |
| WO | 2016021442 A1 | 2/2016 |
| WO | 2017037101 A1 | 3/2017 |
| WO | 2017127897 A1 | 8/2017 |
| WO | 2018014010 A1 | 1/2018 |

OTHER PUBLICATIONS

AU-2017296234 Examination Report No. 1 dated Jul. 19, 2018.
AU-2017296234 Examination Report No. 2 dated Sep. 24, 2018.
Energy_In illustrated Dictionary of Science, Andromeda, edited by Michael Allaby. Windmill Books {Andromeda International), 1988. https://search.credorederence.com/contenl/entry/andidsci/energy/0?institutionld= 7 43 {Year 1988).
EP-17828597.9—European Search Report of the European Patent Office dated Jul. 20, 2020.
EP-17828613.4 European Extended Search Report of European Patent Office dated Mar. 6, 2020.
EP-17828622.5 European Extended Search Report of European Patent Office dated Mar. 6, 2020.
EP-17828632.4 European Search Report of European Patent Office dated Jun. 29, 2020.
Fifty years of Anderson localization, Ad Lagendijk, Bart van Tiggelen, and Diederik S. Wiersma, Phsyics Today 62(8), 24 (2009). {Year: 2009).
Gerald, "Size of Letters Required for Visibility as a Function of Viewing Distance and Observer Visual Acuity", U.S. Department of Commerce/National Bureau of Statistics, Jul. 1983.
International Search Report and Written Opinion of PCT/US2017/042276 dated Nov. 24, 2017.
International Search Report and Written Opinion of PCT/US2017/042418 dated Dec. 20, 2017.
International Search Report and Written Opinion of PCT/US2017/042452 dated Nov. 17, 2017.
International Search Report and Written Opinion of PCT/US2017/042470 dated Dec. 28, 2017.
International Search Report and Written Opinion of PCT/US2019/013310 dated May 13, 2019.
International Search Report and Written Opinion of PCT/US2019/013399 dated Jun. 10, 2019.
International Search Report and Written Opinion of PCT/US2019/013552 dated May 2, 2019.
International Search Report and Written Opinion of PCT/US2019/013556 dated Apr. 18, 2019.
NZ-743822 Further Examination Report dated Jun. 11, 2019.
TW-106123879 Office Action of the Taiwan Patent Office dated Nov. 2, 2020.
Wetzstein et al., "On Plenoptic Multiplexing and Reconstruction." International Journal on Computer Vision {IJVC), Springer, 2013, 101(2), pp. 384-400 [online][retrieved on Sep. 26, 2017].
IN201917001780 First Examination Report from the Indian Patent Office dated Aug. 13, 2021.
JP2019-501706 Non-Final Notice of Reasons for Rejection from the Japan Patent Office dated Aug. 10, 2021.
Choi et al., "Multiple-viewing-zone integral imaging using a dynamic barrier array for three-dimensional displays", Optics Express, vol. 11, No. 8, Apr. 21, 2003 (Apr. 21, 2003), p. 927.
EP-19738244.3 European Extended Search Report of European Patent Office dated Oct. 4, 2021.
Levoy et al., "Light Field rendering", Computer Graphics and Interactive Techniques, ACM, 2 Penn Plaza, Suite 701 New York NY 10121-0701 USA, Aug. 1, 1996 (Aug. 1, 1996), p. 31-42.
CN201980018317.9 First Office Action of the Chinese Patent Office dated May 18, 2022.
JP2022-076343 Non-Final Notice of Reasons for Rejection of the Japan Patent Office dated Mar. 14, 2023.
JP-2020-538937 Non-Final Office Action of the Japanese Patent Office dated Jan. 24, 2023. (resubmitting copy of NFOA with all the pages—previously cited art with IDS filed on Feb. 17, 2023).

* cited by examiner

ORDERED GEOMETRIES FOR OPTOMIZED HOLOGRAPHIC PROJECTION

CROSS-REFERENCE TO RELATED APPLICATIONS

This application claims the benefit of priority to U.S. Provisional Patent Application No. 62/617,288, entitled "System and Methods for Transverse Energy Localization in Energy Relays Using Ordered Structures," filed Jan. 14, 2018, and to U.S. Provisional Patent Application No. 62/617,293, entitled "Novel Application of Holographic and Light Field Technology," filed Jan. 14, 2018, which are both herein incorporated by reference in their entirety.

TECHNICAL FIELD

This disclosure is related to energy directing devices, and specifically to energy waveguides configured to direct energy in accordance with a four-dimensional plenoptic system.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

Disclosed are systems for defining a plurality of energy propagation paths, and directing energy according to a four-dimensional function. Configurations of waveguide arrays are disclosed for improved efficiency and resolution of propagated energy through tessellation of shaped energy waveguides.

In an embodiment, an energy waveguide system for defining a plurality of energy propagation paths comprises: an array of energy waveguides, the array comprising a first side and a second side, and being configured to direct energy therethrough along a plurality of energy propagation paths extending through a plurality of energy locations on the first side; wherein a first subset of the plurality of energy propagation paths extend through a first energy location; wherein a first energy waveguide is configured to direct energy along a first energy propagation path of the first subset of the plurality of energy propagation paths, the first energy propagation path defined by a first chief ray formed between the first energy location and the first energy waveguide, and further wherein the first energy propagation path extends from the first energy waveguide towards the second side of the array in a unique direction which is determined at least by the first energy location; and wherein each waveguide of the array of waveguides comprises a shape of a set of one or more shapes configured to tessellate across a transverse plane of the energy waveguide system, the array of energy waveguides being arranged in a tiling of the one or more shapes across the transverse plane of the energy waveguide system.

DETAILED DESCRIPTION

Figure 1:
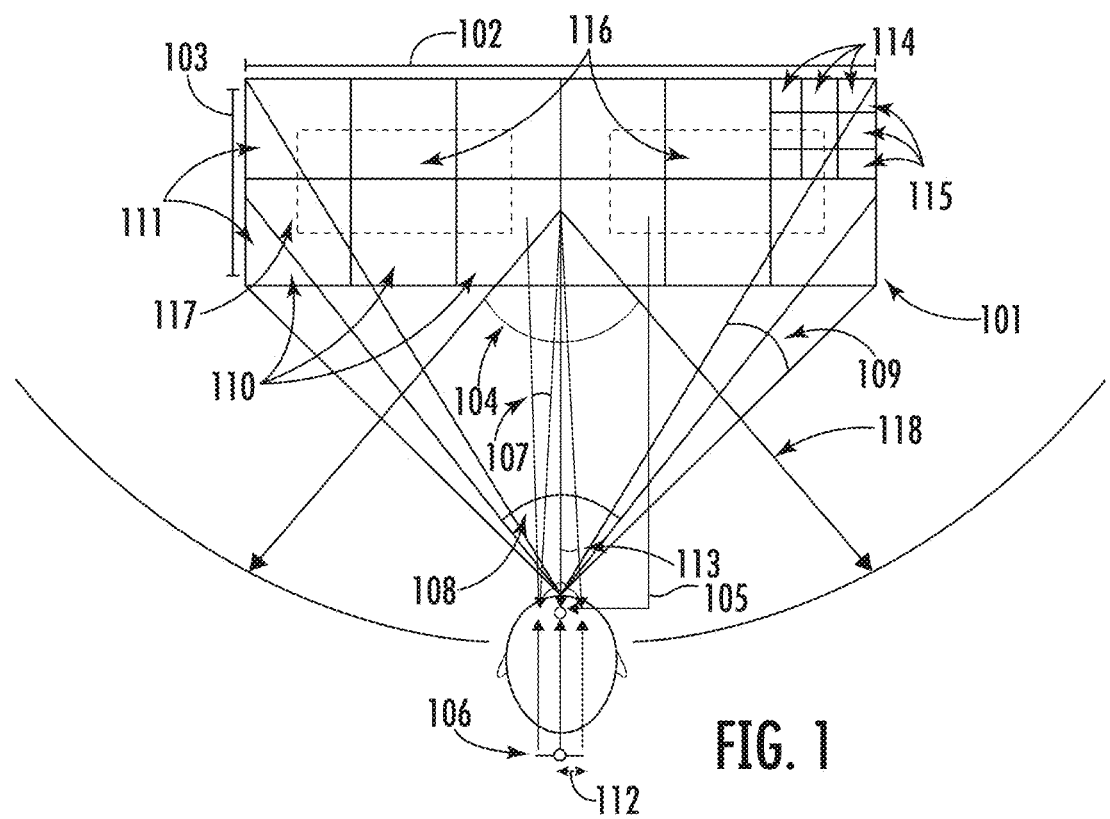
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of electromagnetic and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory systems at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bi-directional energy surface architecture, all components may be configured to form the appropriate structures for any energy domain to enable holographic propagation.

However, the main challenge to enable the Holodeck today involves available visual technologies and electromagnetic device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations: Overview of Light Field Energy Propagation Resolution Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult inter-ocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/−60 degrees about the center of the display), desired intermediate samples at a distance (e.g., one additional propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\text{Surface Aspect Ratio} = \frac{\text{Width } (W)}{\text{Height } (H)}$$

$$\text{Surface Horizontal Size} = \text{Surface Diagonal} * \left( \frac{1}{\sqrt{1 + \left(\frac{H}{W}\right)^2}} \right)$$

$$\text{Surface Vertical Size} = \text{Surface Diagonal} * \left( \frac{1}{\sqrt{1 + \left(\frac{W}{H}\right)^2}} \right)$$

$$\text{Horizontal Field of View} = 2 * \text{atan}\left( \frac{\text{Surface Horizontal Size}}{2 * \text{Seating Distance}} \right)$$

$$\text{Vertical Field of View} = 2 * \text{atan}\left( \frac{\text{Surface Verticle Size}}{2 * \text{Seating Distance}} \right)$$

$$\text{Horizontal Element Resolution} = \text{Horizontal } FoV * \frac{60}{\text{Eye Resolution}}$$

$$\text{Vertical Element Resolution} = \text{Vertical } FoV * \frac{60}{\text{Eye Resolution}}$$

The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\text{Sample Distance} = \frac{\text{Inter-Ocular Distance}}{(\text{Number of Desired Intermediate Samples} + 1)}$$

$$\text{Angular Sampling} = \text{atan}\left( \frac{\text{Sample Distance}}{\text{Seating Distance}} \right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

$$\text{Locations Per Element}(N) = \frac{\text{Seating } FoV}{\text{Angular Sampling}}$$

$$\text{Total Resolution } H = N * \text{Horizontal Element Resolution}$$

$$\text{Total Resolution } V = N * \text{Vertical Element Resolution}$$

With the above scenario given the size of energy surface and the angular resolution addressed for the visual acuity system, the resultant energy surface may desirably include approximately 400 k×225 k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Figure 2:
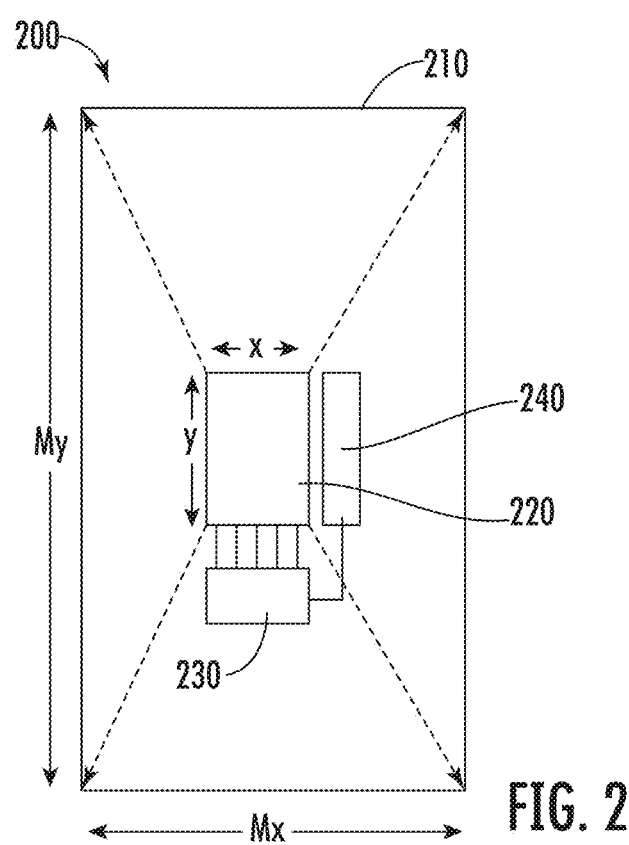
FIG. 2 is a schematic diagram illustrating an energy system having an active device area with a mechanical envelope.

Current Technology Limitations: Active Area, Device Electronics, Packaging, and the Mechanical Envelope FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface, given:

$$\text{Devices } H = \frac{\text{Total Resolution } H}{\text{Device Resolution } H}$$

$$\text{Devices } V = \frac{\text{Total Resolution } V}{\text{Device Resolution } V}$$

Given the above resolution considerations, approximately 105×105 devices similar to those shown in FIG. 2 may be desired. It should be noted that many devices may include various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces: Configurations and Designs for Arrays of Energy Relays In some embodiments, approaches are disclosed to address the challenge of generating high energy location density from an array of individual devices without seams due to the limitation of mechanical structure for the devices. In an embodiment, an energy propagating relay system may allow for an increase in the effective size of the active device area to meet or exceed the mechanical dimensions to configure an array of relays and form a singular seamless energy surface.

Figure 3:
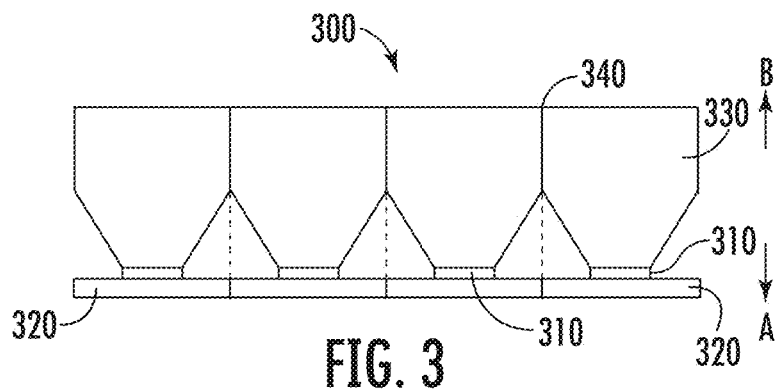
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm, an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figure 4:
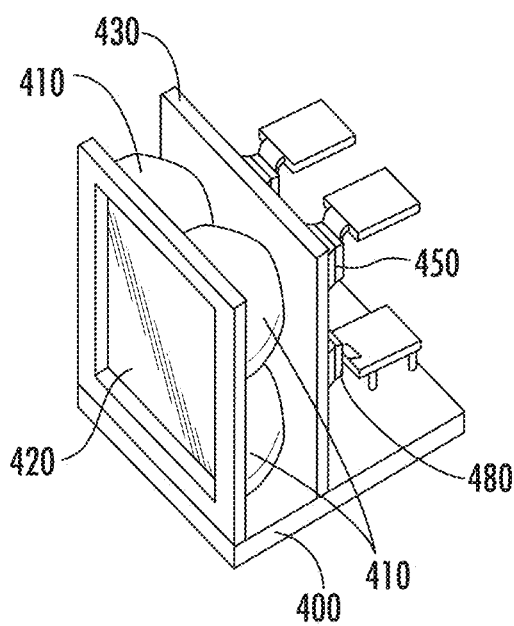
FIG. 4 is a schematic diagram illustrating an embodiment of energy relay elements adhered together and fastened to a base structure.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless display surface directing energy along propagation paths extending between one or more energy locations and the seamless display surface, and where the separation between the edges of any two adjacent second sides of the terminal energy relay elements is less than the minimum perceptible contour as defined by the visual acuity of a human eye having better than 20/40 vision at a distance greater than the width of the singular seamless display surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10-degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bi-directional energy propagation throughout the system.

In an embodiment, the energy relays are provided as loose coherent elements.

Introduction to Component Engineered Structures:
Disclosed Advances in Transverse Anderson
Localization Energy Relays The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

Figure 5A:
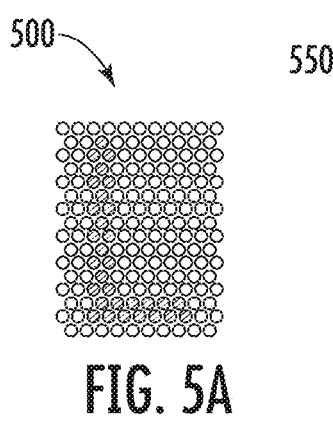
FIG. 5A is a schematic diagram illustrating an example of a relayed image through multi-core optical fibers.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 5A.

Figure 5B:
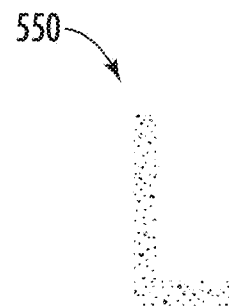
FIG. 5B is a schematic diagram illustrating an example of a relayed image through an optical relay that exhibits the properties of the Transverse Anderson Localization principle.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein energy waves propagating through the energy relay have higher transport efficiency in the longitudinal orientation versus the transverse orientation and are spatially localized in the transverse orientation.

In an embodiment, a randomized distribution of material wave propagation properties in a transverse plane within the dimensional lattice may lead to undesirable configurations due to the randomized nature of the distribution. A randomized distribution of material wave propagation properties may induce Anderson Localization of energy on average across the entire transverse plane, however limited areas of similar materials having similar wave propagation properties may form inadvertently as a result of the uncontrolled random distribution. For example, if the size of these local areas of similar wave propagation properties become too large relative to their intended energy transport domain, there may be a potential reduction in the efficiency of energy transport through the material.

In an embodiment, a relay may be formed from a randomized distribution of component engineered structures to transport visible light of a certain wavelength range by inducing Transverse Anderson Localization of the light. However, due to their random distribution, the structures may inadvertently arrange such that a continuous area of a single component engineered structure forms across the transverse plane which is multiple times larger than the wavelength of visible light. As a result, visible light propagating along the longitudinal axis of the large, continuous, single-material region may experience a lessened Transverse Anderson Localization effect and may suffer degradation of transport efficiency through the relay.

In an embodiment, it may be desirable to design a non-random pattern of material wave propagation properties in the transverse plane of an energy relay material. Such a non-random pattern would ideally induce an energy localization effect through methods similar to Transverse Anderson Localization, while minimizing potential reductions in transport efficiency due to abnormally distributed material properties inherently resulting from a random property distribution. Using a non-random pattern of material wave propagation properties to induce a transverse energy localization effect similar to that of Transverse Anderson Localization in an energy relay element will hereafter be referred to as Ordered Energy Localization.

In an embodiment, multiple energy domains may be configured within a single, or between multiple Ordered Energy Localization energy relays to direct one or more sensory holographic energy propagation paths including visual, acoustic, tactile or other energy domains.

In an embodiment, a seamless energy surface is configured with Ordered Energy Localization energy relays that comprise two or more first sides for each second side to both receive and emit one or more energy domains simultaneously to provide bi-directional energy propagation throughout the system.

In an embodiment, the Ordered Energy Localization energy relays are configured as loose coherent or flexible energy relay elements.

Considerations for 4D Plenoptic Functions: Selective Propagation of Energy Through Holographic Waveguide Arrays As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plenoptic function with a structure configured to alter an angular direction of the energy waves passing through representing the angular component of the 4D plenoptic function, wherein the energy waves propagated may converge in space in accordance with a plurality of propagation paths directed by the 4D plenoptic function.

Figure 6:
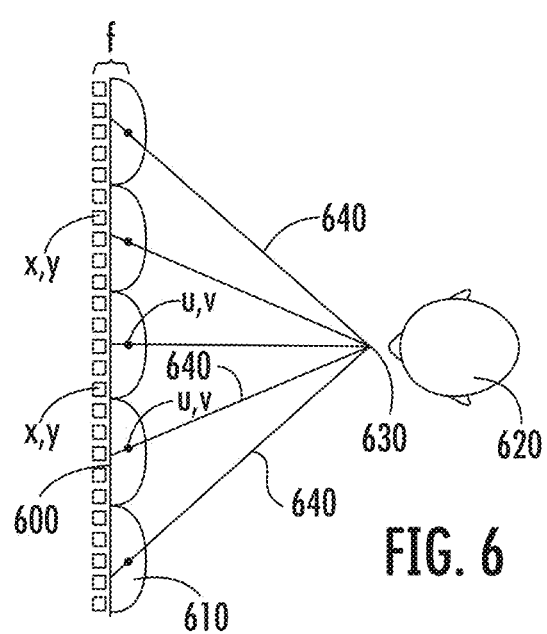
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general, and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due to designs that have not accurately accounted for any of diffraction, scatter, diffusion, angular direction, calibration, focus, collimation, curvature, uniformity, element crosstalk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bi-directional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck: Aggregation of Bi-directional Seamless Energy Surface Systems to Stimulate Human Sensory Receptors within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bi-directional holographic energy propagation, emission, reflection, or sensing.

In an embodiment, an environment of tiled seamless energy systems are aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregates tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bi-directionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bi-directional energy propagation and aggregated surfaces are possible.

In an embodiment, the system comprises an energy waveguide capable of bi-directional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bi-directional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bi-directional captured data and projection information.

In some embodiments, a plurality of combinations of three energy devices comprising an ultrasonic sensor, a visible electromagnetic display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and electromagnetic energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bi-directional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

Selective Propagation of Energy in Light Field and Holographic Waveguide Arrays

Figure 7:
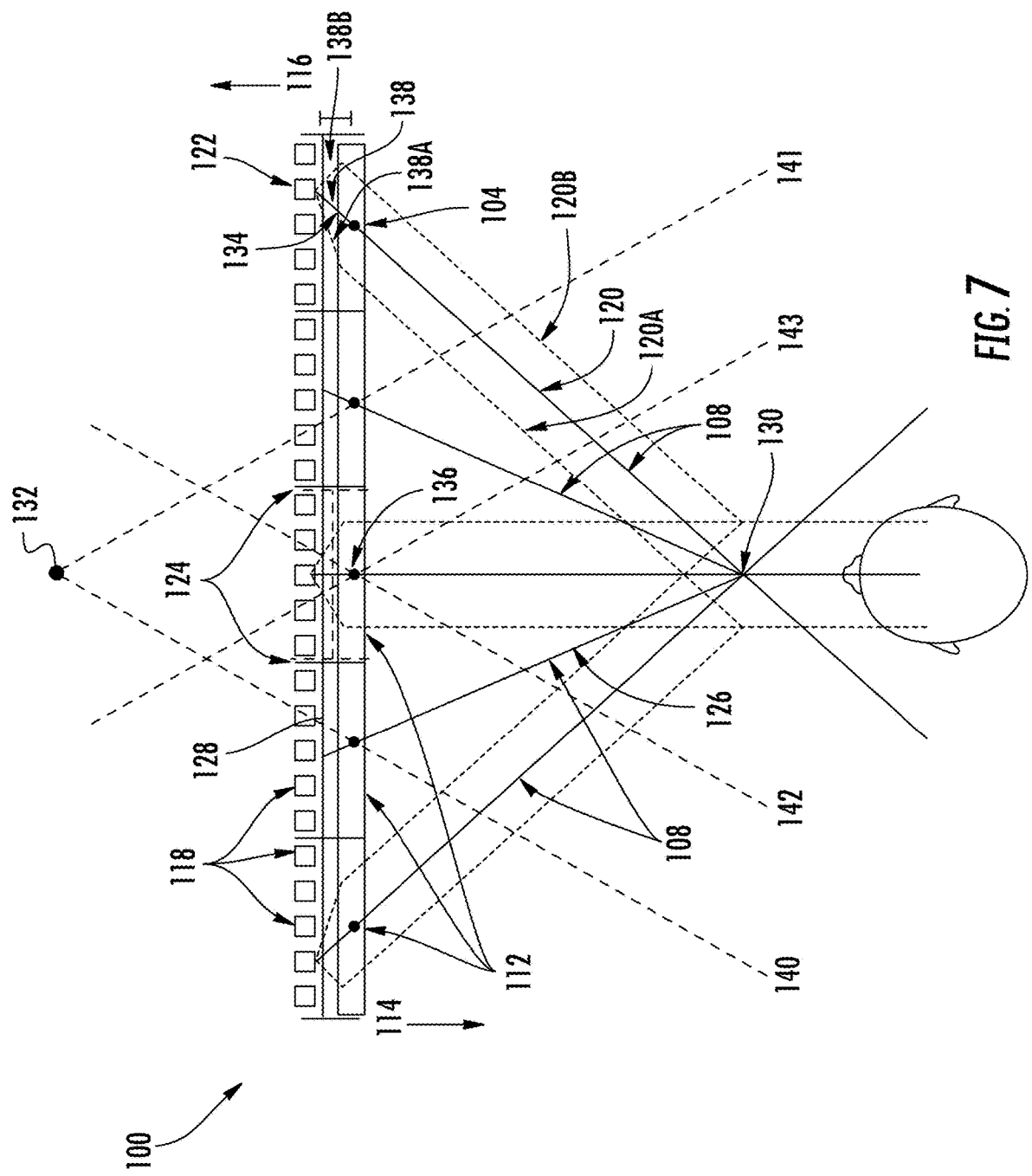
FIG. 7 illustrates a top-down perspective view of an embodiment of an energy waveguide system operable to define a plurality of energy propagation paths.

FIG. 7 illustrates a top-down perspective view of an embodiment of an energy waveguide system 100 operable to define a plurality of energy propagation paths 108. Energy waveguide system 100 comprises an array of energy waveguides 112 configured to direct energy therethrough along the plurality of energy propagation paths 108. In an embodiment, the plurality of energy propagation paths 108 extend through a plurality of energy locations 118 on a first side of the array 116 to a second side of the array 114.

Referring to FIG. 7, in an embodiment, a first subset of the plurality of energy propagation paths 108 extend through a first energy location 122. The first energy waveguide 104 is configured to direct energy along a first energy propagation path 120 of the first subset of the plurality of energy propagation paths 108. The first energy propagation path 120 may be defined by a first chief ray 138 formed between the first energy location 122 and the first energy waveguide 104. The first energy propagation path 120 may comprise rays 138A and 138B, formed between the first energy location 122 and the first energy waveguide 104, which are directed by first energy waveguide 104 along energy propagation paths 120A and 120B, respectively. The first energy propagation path 120 may extend from the first energy waveguide 104 towards the second side of the array 114. In an embodiment, energy directed along the first energy propagation path 120 comprises one or more energy propagation paths between or including energy propagation paths 120A and 120B, which are directed through the first energy waveguide 104 in a direction that is substantially parallel to the angle propagated through the second side 114 by the first chief ray 138.

Embodiments may be configured such that energy directed along the first energy propagation path 120 may exit the first energy waveguide 104 in a direction that is substantially parallel to energy propagation paths 120A and 120B and to the first chief ray 138. It may be assumed that an energy propagation path extending through an energy waveguide element 112 on the second side 114 comprises a plurality of energy propagation paths of a substantially similar propagation direction.

Figure 8:
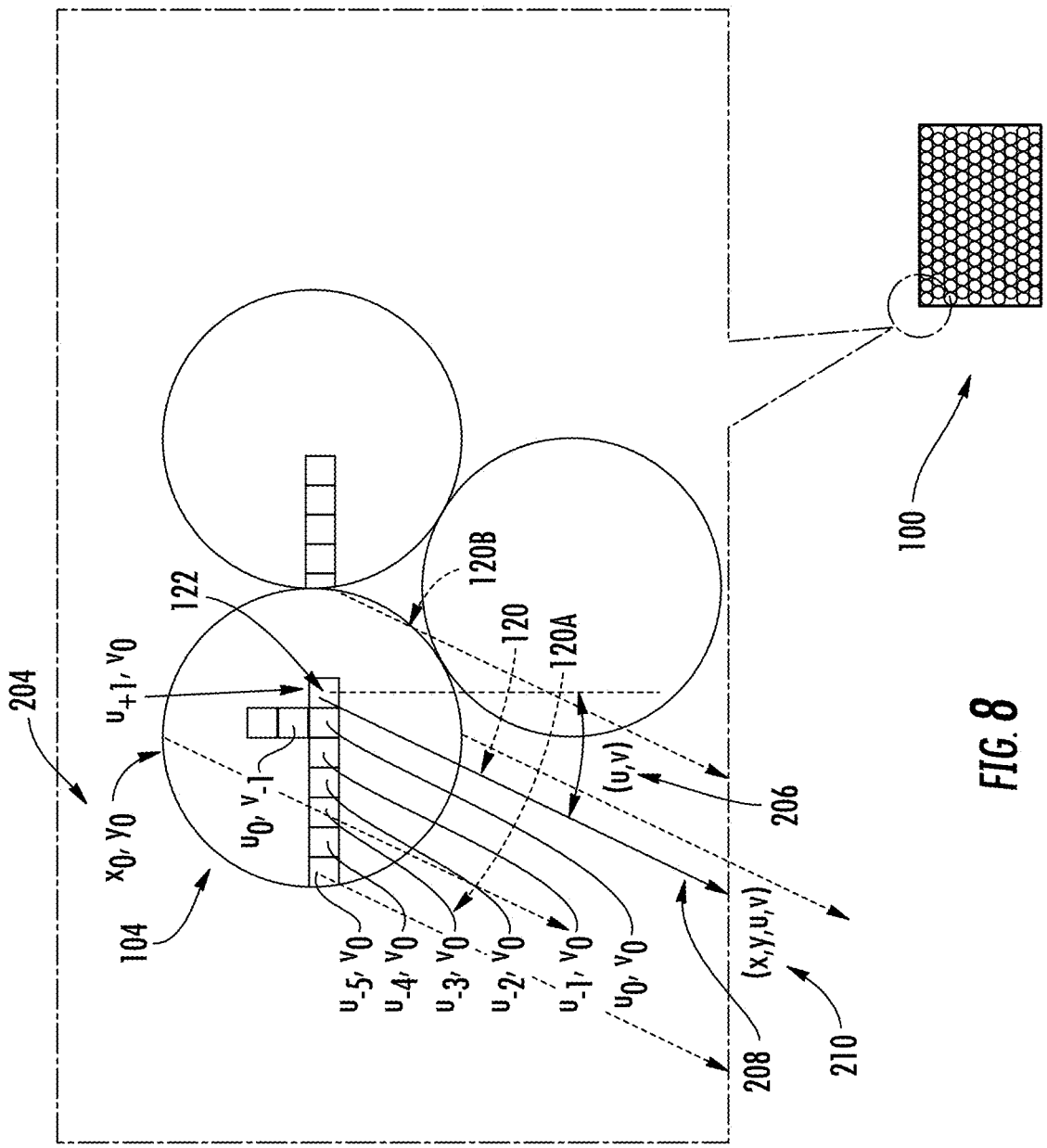
FIG. 8 is a front view illustration of an embodiment of an energy waveguide system.

FIG. 8 is a front view illustration of an embodiment of energy waveguide system 100. The first energy propagation path 120 may extend towards the second side 114 of the array 112 shown in FIG. 7 in a unique direction 208 extending from the first energy waveguide 104, which is determined at least by the first energy location 122. The first energy waveguide 104 may be defined by a spatial coordinate 204, and the unique direction 208 which is determined at least by first energy location 122 may be defined by an angular coordinate 206 defining the directions of the first energy propagation path 120. The spatial coordinate 204 and the angular coordinate 206 may form a four-dimensional plenoptic coordinate set 210 which defines the unique direction 208 of the first energy propagation path 120.

In an embodiment, energy directed along the first energy propagation path 120 through the first energy waveguide 104 substantially fills a first aperture 134 of the first energy waveguide 104, and propagates along one or more energy propagation paths which lie between energy propagation paths 120A and 120B and are parallel to the direction of the first energy propagation path 120. In an embodiment, the one or more energy propagation paths that substantially fill the first aperture 134 may comprise greater than 50% of the first aperture 134 diameter.

In a preferred embodiment, energy directed along the first energy propagation path 120 through the first energy waveguide 104 which substantially fills the first aperture 134 may comprise between 50% to 80% of the first aperture 134 diameter.

Turning back to FIG. 7, in an embodiment, the energy waveguide system 100 may further comprise an energy inhibiting element 124 positioned to limit propagation of energy between the first side 116 and the second side 114 and to inhibit energy propagation between adjacent waveguides 112. In an embodiment, the energy inhibiting element is configured to inhibit energy propagation along a portion of the first subset of the plurality of energy propagation paths 108 that do not extend through the first aperture 134. In an embodiment, the energy inhibiting element 124 may be located on the first side 116 between the array of energy waveguides 112 and the plurality of energy locations 118. In an embodiment, the energy inhibiting element 124 may be located on the second side 114 between the plurality of energy locations 118 and the energy propagation paths 108. In an embodiment, the energy inhibiting element 124 may be located on the first side 116 or the second side 114 orthogonal to the array of energy waveguides 112 or the plurality of energy locations 118.

In an embodiment, an energy inhibiting material may comprise a baffle structure, and may be configured to attenuate or modify an energy propagation path. The energy inhibiting structure may comprise a blocking structure, an element configured to alter a first energy propagation path to alter a fill factor of a first aperture, or a structure configured to limit an angular extent of energy proximate the first energy location. In an embodiment, the energy inhibiting structure may limit an angular extent of energy proximate an energy location. In an embodiment, an energy inhibiting structure may comprise at least one numerical aperture. In an embodiment, an energy inhibiting structure may be positioned adjacent to an energy waveguide and may extend towards an energy location. In an embodiment, an energy inhibiting structure may be positioned adjacent to an energy location and extend towards an energy waveguide.

In an embodiment, energy directed along the first energy propagation path 120 may converge with energy directed along a second energy propagation path 126 through a second energy waveguide 128. The first and second energy propagation paths may converge at a location 130 on the second side 114 of the array 112. In an embodiment, a third and fourth energy propagation paths 140, 141 may also converge at a location 132 on the first side 116 of the array 112. In an embodiment, a fifth and sixth energy propagation paths 142, 143 may also converge at a location 136 between the first and second sides 116, 114 of the array 112.

In an embodiment, the energy waveguide system 100 may comprise structures for directing energy such as: a structure configured to alter an angular direction of energy passing therethrough, for example a refractive, diffractive, reflective, gradient index, holographic, or other optical element; a structure comprising at least one numerical aperture; a structure configured to redirect energy off at least one internal surface; an optical relay; etc. It is to be appreciated that the waveguides 112 may include any one or combination of bidirectional energy directing structure or material, such as:

a) refraction, diffraction, or reflection;
    b) single or compound multilayered elements;
    c) holographic optical elements and digitally encoded optics;
    d) 3D printed elements or lithographic masters or replicas;
    e) Fresnel lenses, gratings, zone plates, binary optical elements;
    f) retro reflective elements;
    g) fiber optics, total internal reflection or Anderson Localization;
    h) gradient index optics or various refractive index matching materials;

i) glass, polymer, gas, solids, liquids;
j) acoustic waveguides;
k) micro & nano scale elements; or
l) polarization, prisms or beam splitters.

In an embodiment, the energy waveguide systems propagate energy bidirectionally.

In an embodiment, the energy waveguides are configured for propagation of mechanical energy.

In an embodiment, the energy waveguides are configured for propagation of electromagnetic energy.

In an embodiment, by interlacing, layering, reflecting, combining, or otherwise provisioning the appropriate material properties within one or more structures within an energy waveguide element, and within one or more layers comprising an energy waveguide system, the energy waveguides are configured for simultaneous propagation of mechanical, electromagnetic and/or other forms of energy.

In an embodiment, the energy waveguides propagate energy with differing ratios for u and v respectively within a 4D coordinate system.

In an embodiment, the energy waveguides propagate energy with an anamorphic function. In an embodiment, the energy waveguides comprise multiple elements along the energy propagation path.

In an embodiment, the energy waveguides are directly formed from optical fiber relay polished surfaces.

In an embodiment, the energy waveguide system comprises materials exhibiting Transverse Anderson Localization.

In an embodiment, the energy waveguide system propagates hypersonic frequencies to converge tactile sensation in a volumetric space.

Figure 9:
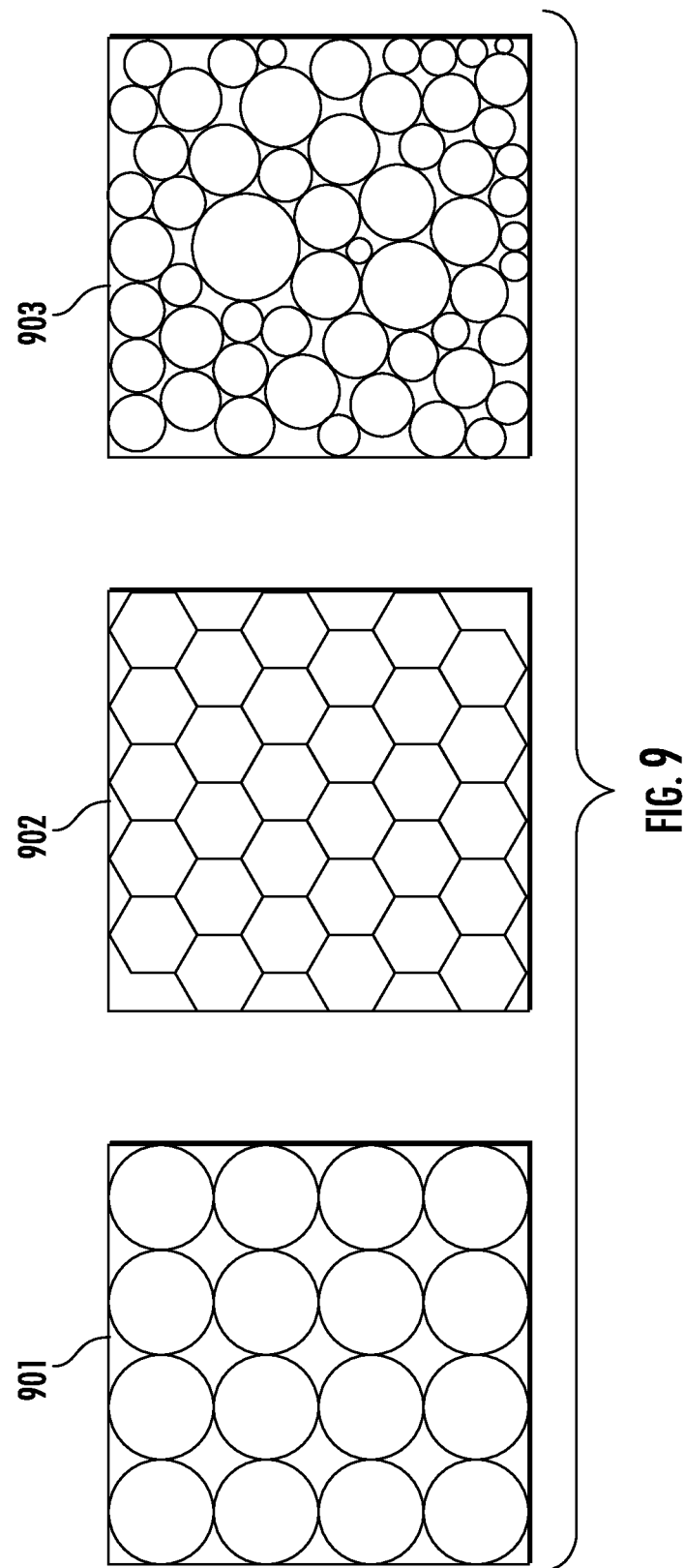
FIG. 9 highlights the differences between square packing, hex packing and irregular packing for energy waveguide design considerations.

In an embodiment, the array of energy waveguide elements may include:
 a) A hexagonal packing of the array of energy waveguides;
 b) A square packing of the array of energy waveguides;
 c) An irregular or semi-regular packing of the array of energy waveguides;
 d) Curved or Non-planar array of energy waveguides;
 e) Spherical array of energy waveguides;
 f) Cylindrical array of energy waveguides;
 g) Tilted regular array of energy waveguides;
 h) Tilted irregular array of energy waveguides;
 i) Spatially varying array of energy waveguides;
 j) Multi-layered array of energy waveguides;

FIG. 9 highlights the differences between square packing 901, hex packing 902 and irregular packing 903 of an array of energy waveguide elements.

Energy waveguides may be fabricated on a glass or plastic substrate to specifically include optical relay elements if desirable and may be designed with glass or plastic optical elements to specifically include optical relays as well as desired. Furthermore, the energy waveguide may be faceted for designs that provide multiple propagation paths or other column/row or checkerboard orientations, specifically considering but not limited to multiple propagation paths separated by beam-splitters or prisms, or tiled for waveguide configurations that allow for tiling, or a singular monolithic plate, or tiled in a curved arrangement (e.g. faceted cylinder or spherical with geometry alterations to the tiles to mate accordingly), curved surfaces to include but not limited to spherical and cylindrical or any other arbitrary geometry as required for a specific application.

Figure 10:
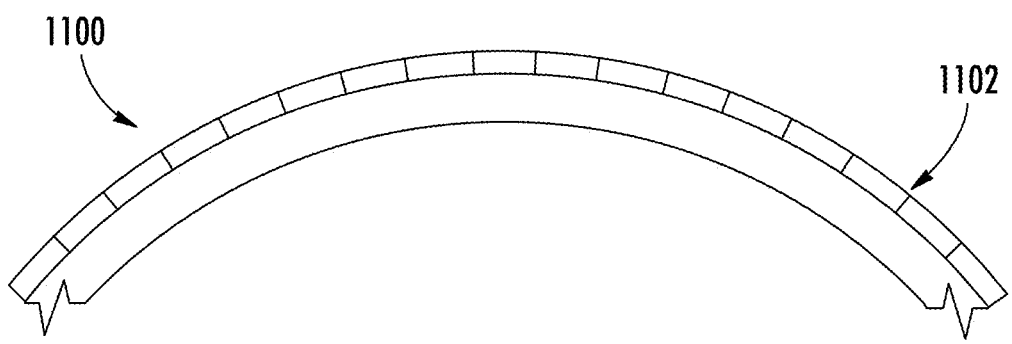
FIG. 10 illustrates an orthogonal view of an embodiment featuring an array of energy waveguides arranged in a curved configuration.

In an embodiment where the array of energy waveguides comprises a curved configuration, the curved waveguide may be produced via heat treatments or by direct fabrication onto curved surfaces to include optical relay elements. FIG. 10 is an illustration of an embodiment 1100 featuring an array of energy waveguides 1102 arranged in a curved configuration.

In an embodiment, the array of energy waveguides may abut other waveguides and may cover entire walls and/or ceilings and or rooms depending on specific application. The waveguides may be designed explicitly for substrate up or substrate down mounting. The waveguide may be designed to mate directly to an energy surface or be offset with an air gap or other offset medium. The waveguide may include an alignment apparatus to provide the ability to focus the plane actively or passively either as a permanent fixture or a tooling element. The purposes of the geometries described is to help optimize the angle of view defined by the normal of the waveguide element and the represented imagery. For a very large energy surface planar surface, the majority of the angular samples at the left and right-most of the surface are mainly outside of the viewing volume for an environment. For that same energy surface, with a curved contour and a curved waveguide, the ability to use more of these propagating rays to form the converging volume is increased significantly. This is however at the expense of usable information when off-axis. The application specific nature of the design generally dictates which of the proposed designs will be implemented. Furthermore, a waveguide may be designed with regular, graduated, or regional element structures that are fabricated with an additional waveguide element to tilt the element towards a predetermined waveguide axis.

In embodiments where the energy waveguides are lenses, the embodiments may include both convex and concave lenslets, and may include the fabrication of the lenses directly onto an optical relay surface. This may involve destructive or additive lenslet fabrication processes to include removal of material to form or stamp and lenslet profile, or the direct replica fabricated directly to this surface.

An embodiment may include a multiple layered waveguide design that provides additional energy propagation optimizations and angular control. All of the above embodiments may be combined together independently or in conjunction with this approach. In an embodiment, a multiple layered design may be envisioned with tilted waveguide structures on a first waveguide element and a regionally varying structure for a second waveguide element.

An embodiment includes the design and fabrication of a per element or per region liquid lens waveguide joined together as a single waveguide. An additional design of this approach includes a single birefringent or liquid lens waveguide electrical cell that can modify an entire waveguide array simultaneously. This design provides the ability to dynamically control the effective waveguide parameters of the system without redesigning the waveguide.

In an embodiment configured to direct light, with any combination of the disclosures provided herein, it is possible to generate a wall mounted 2D, light field or holographic display. The wall mounted configuration is designed such that a viewer is looking at an image that may float in front, at or behind of the designed display surface. With this approach, the angular distribution of rays may be uniform, or provided with increased density at any particular placement in space depending on specific display requirements. In this fashion, it is possible to configure the waveguides to alter angular distribution as a function of surface profile. For example, for a given distance perpendicular to the display surface and a planar waveguide array, an optically perfect waveguide would provide increased density at the perpendicular center of the display with a gradual increase in ray separation distance along a given perpendicular distance to the display. Conversely, if viewing the rays radially about the display where a viewer maintains a distance between the eyes and the center point of the display, the viewed rays would maintain consistent density across the entire field of view. Depending on the anticipated viewing conditions, the properties of each element may be optimized by altering the waveguide functions to produce any potential distribution of rays to optimize the viewing experience for any such environment.

Figure 11:
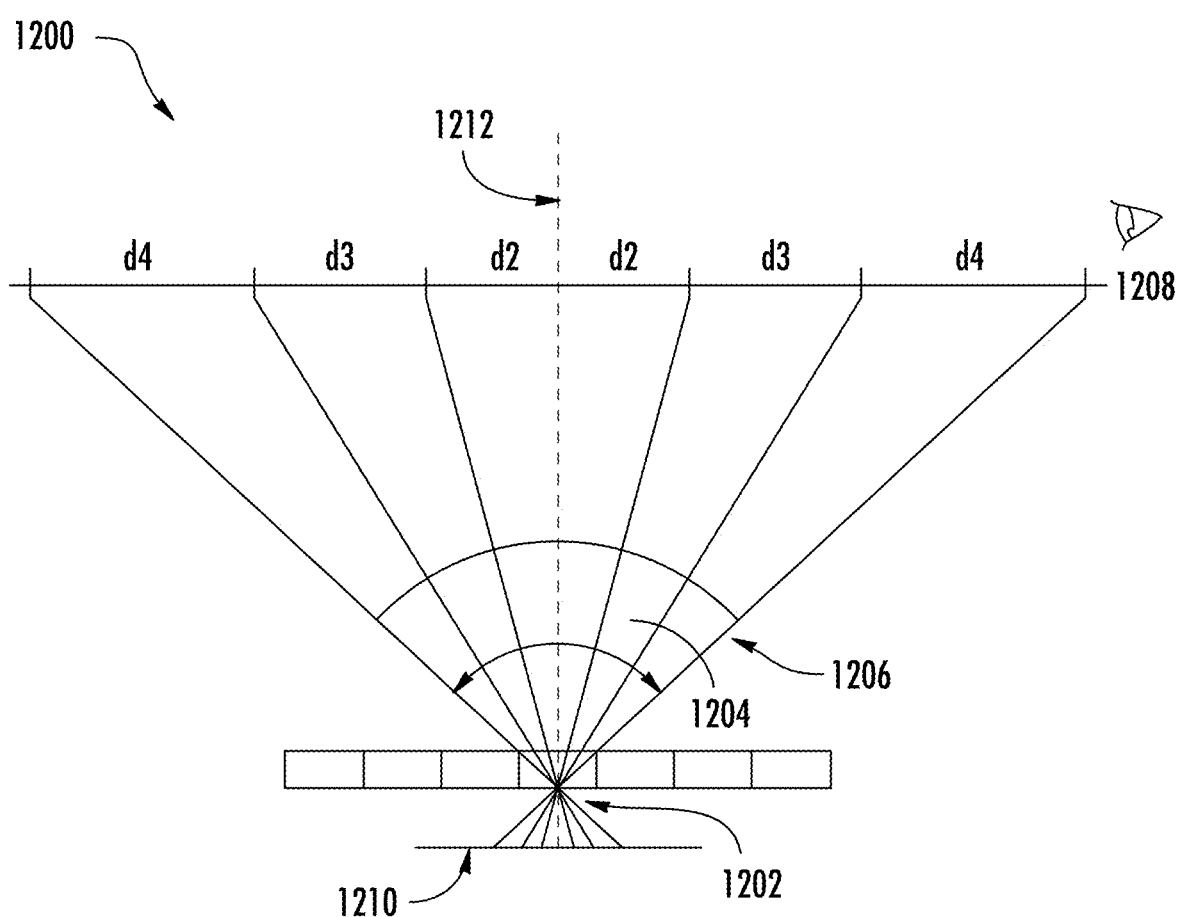
FIG. 11 illustrates an orthogonal view of an embodiment that highlights how a waveguide element may affect a spatial distribution of energy passing therethrough.

FIG. 11 is an illustration of an embodiment 1200 which highlights how a single waveguide element function 1202 may produce identical distribution of energy 1204 across a radial viewing environment 1206, whereas the same waveguide element function 1202 when propagated at a distance 1208 that is constant and parallel to the waveguide surface 1210 will appear to exhibit increased density at the waveguide element center 1212 of the waveguide surface and decreased density further from the center 1212 of the waveguide surface.

Figure 12:
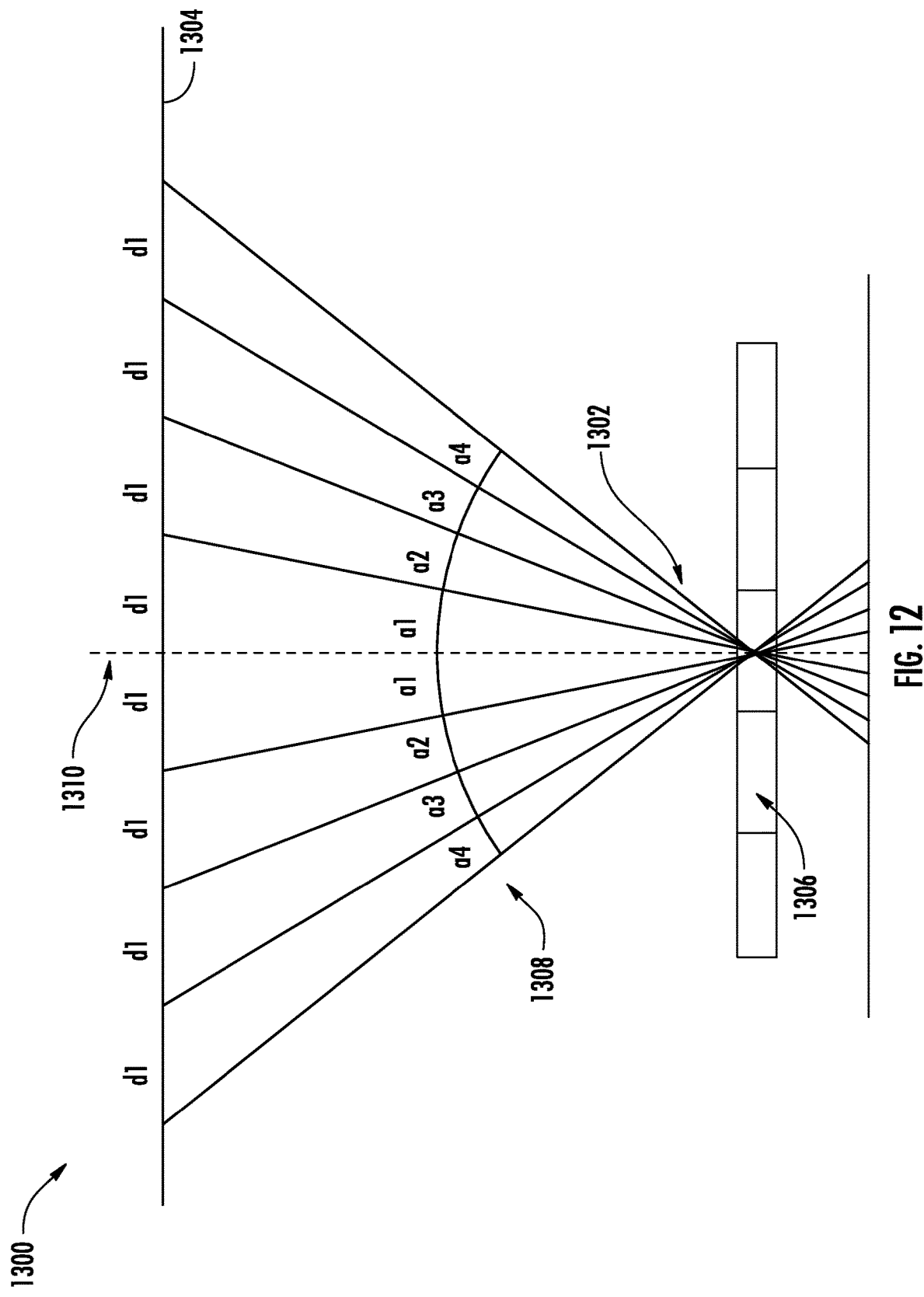
FIG. 12 illustrates an orthogonal view of an additional embodiment which further highlights how a waveguide element may affect a spatial distribution of energy passing therethrough.

FIG. 12 is an illustration of an embodiment 1300 which illustrates configuring the waveguide element functions 1302 to exhibit uniform density at a constant distance 1304 parallel to the waveguide surface 1306 that simultaneously produces apparent lower density at the center 1310 of the waveguide surface 1306 when measured about a radius 1308 about the center of the waveguide surface 1306.

The ability to generate a waveguide function that varies sampling frequency over field distance is a characteristic of various waveguide distortions and known in the art. Traditionally, the inclusion of distortions are undesirable in a waveguide function, however, for the purposes of waveguide element design, these are all characteristics that are claimed as benefits to the ability to further control and distribute the propagation of energy depending on the specific viewing volume required. It may require the addition of multiple functions or layers or a gradient of functions across the entirety of the waveguide array depending on the viewing volume requirements.

In an embodiment, the functions are further optimized by curved surfaces of the energy surface and/or the waveguide array. The variation of the normal of the chief ray angle in relation to the energy surface itself may further increase efficiency and require a different function than a planar surface, although the gradient, variation and/or optimization of the waveguide function still applies.

Further, leveraging the resultant optimized waveguide array in consideration of waveguide stitching methodologies, it is possible to further increase the effective size of the waveguide by tiling each of the waveguides and systems to produce any size or form-factor desired. It is important to note that the waveguide array may exhibit a seam artifact unlike the energy surface by virtue of reflections produced between any two separate substrates, the apparent contrast differential at the mechanical seam, or due to any form of non-square grid packing schema. To counteract this effect, either a larger singular waveguide may be produced, refractive matching materials may be leveraged between the edges of any two surfaces, or regular waveguide grid structures may be employed to ensure that no elements are split between two waveguide surfaces, and/or precision cutting between energy inhibiting elements and seaming along a non-square waveguide grid structure may be leveraged.

With this approach, it is possible to produce room scale 2D, light field and/or holographic displays. These displays may be seamless across large planar or curved walls, may be produced to cover all walls in a cubic fashion, or may be produced in a curved configuration where either a cylindrical-type shape, or a spherical-type shape is formed to increase view angle efficiency of the overall system.

Alternatively, it is possible to design a waveguide function that warps the propagated energy to virtually eliminate the region that is not desired in the required angle of view resulting in a non-uniform distribution of energy propagation. To accomplish this, one may implement a Taurus shaped optical profile, annular lens, concentric prism array, a Fresnel or diffractive function, binary, refractive, holographic, and/or any other waveguide design may allow for a larger aperture and shorter focal length (herein will be referred to as a "Fresnel lenslet") to provide the ability to practically form a single or multi element (or multiple sheets) Fresnel waveguide array. This may or may not be combined with additional optics, including an additional waveguide array, depending on waveguide configuration.

In order to produce wide energy propagation angles (e.g. 180 degrees) a very low effective f/number (e.g. <f/0.5) is required and in order to ensure that no 4D "Disk Flipping" occurs (the ability for the ray from one waveguide element to see undesired energy locations underneath of any second waveguide element), it is further required that the focal length be appropriately matched closely to the angle of view required. This means that in order to produce a ~160 degree viewing volume, an ~f/0.17 lens and a nearly matched ~0.17 mm focal length is required.

Figure 13:
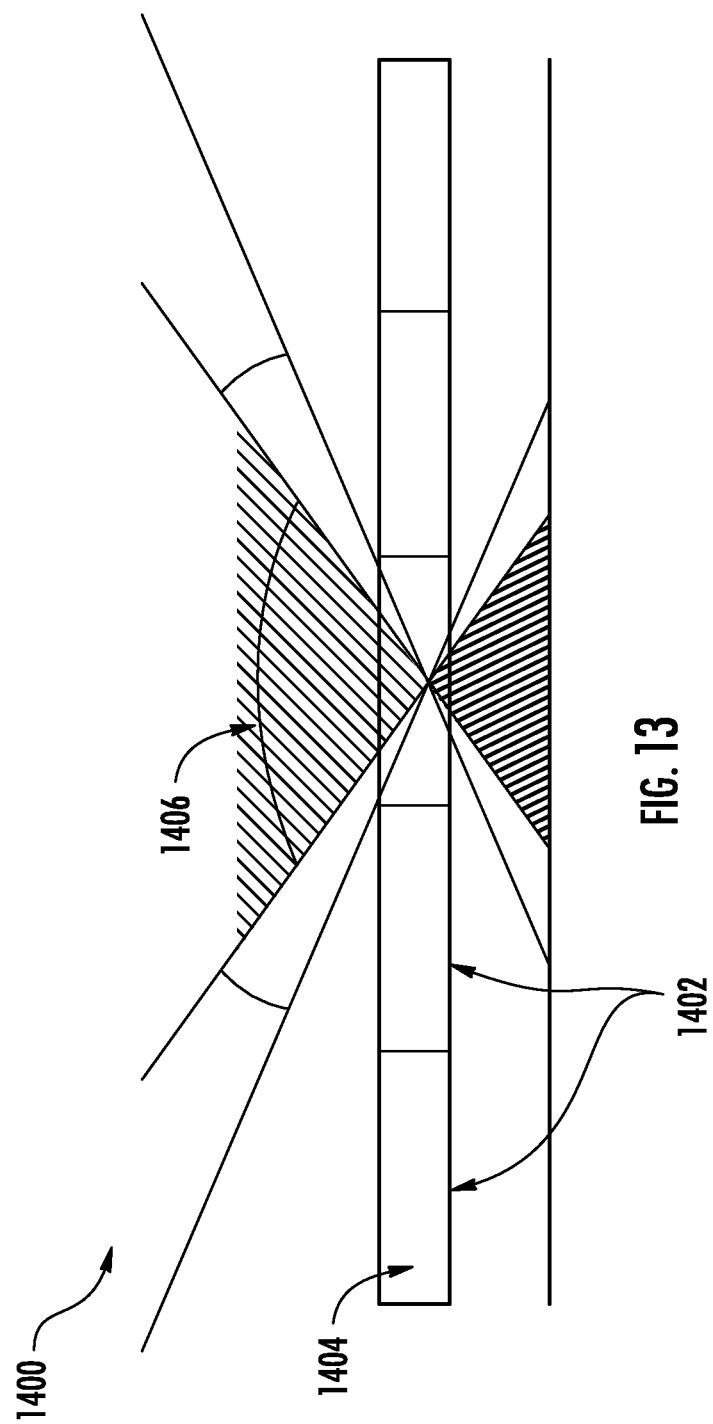
FIG. 13 illustrates an orthogonal view of an embodiment wherein the plurality of energy waveguides comprise diffractive waveguide elements.

FIG. 13 illustrates an embodiment 1400 wherein the plurality of energy waveguides comprise diffractive waveguide elements 1402, and demonstrates one proposed structure for a modified Fresnel waveguide element structure 1404 that produces an effectively extremely short focal length and low f/number while simultaneously directing rays of energy to explicitly defined locations 1406.

Figure 14:
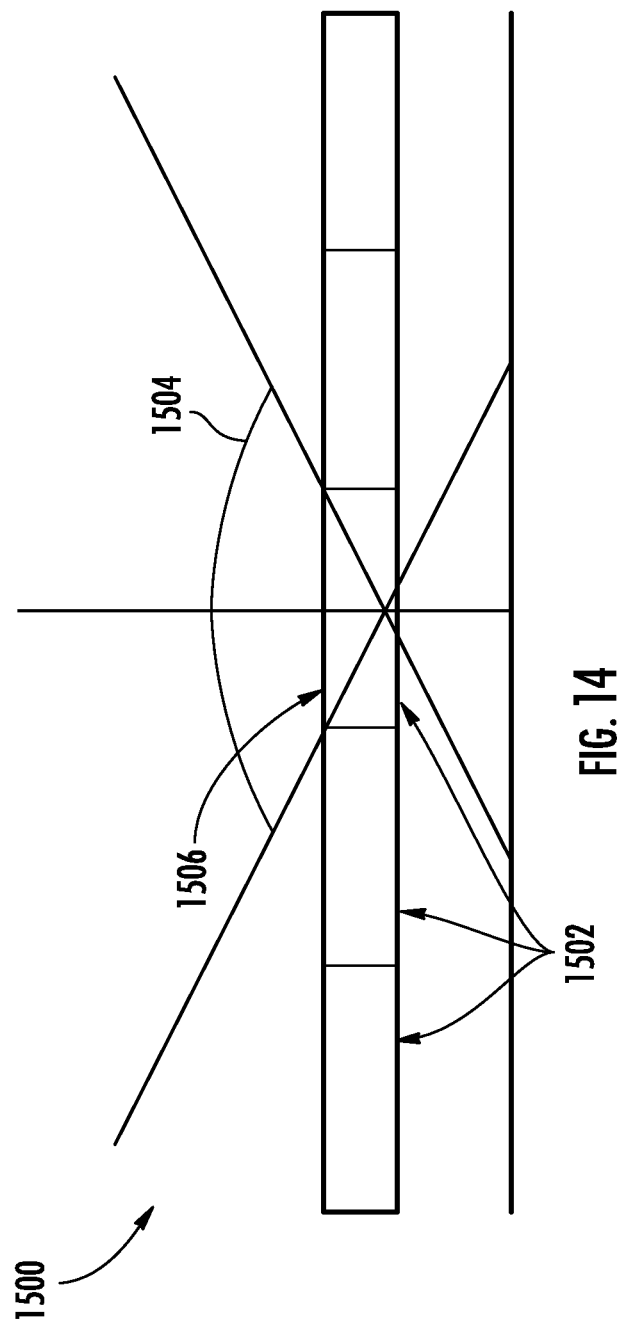
FIG. 14 illustrates an orthogonal view of a lenslet configuration used to provide full density of ray illumination for the desired angle of view.

FIG. 14 illustrates an embodiment 1500 wherein the plurality of energy waveguides comprise elements 1502, and demonstrates how such a waveguide configuration 1506 may be used in an array to provide full density of ray propagation for the desired viewing volume 1504.

A further embodiment of the proposed modified waveguide configuration provides for a method to produce radially symmetric or spiraling rings or gradient of two or more materials along either or both of a transverse or longitudinal orientation with a refractive index separated by a predetermined amount with a per ring pitch with a diameter of X, where X may be constant or variable.

In a further embodiment, equal or non-linear distribution of all of the rays are produced with or without the modified waveguide configurations for wall-mounted and/or table-mounted waveguide structures as well as all room or environment based waveguide structures where multiple waveguides are tiled.

With a waveguide array, it is possible to produce planes of projected light that converge in space at a location that is not located at the surface of the display itself. By ray-tracing these rays, one can clearly see the geometry involved and how converging rays may appear both in-screen (away from the viewer) as well as off-screen (towards viewer) or both simultaneously. As planes move away from the viewer on planar displays with traditional waveguide array designs, the planes tend to grow with the frustum of the viewpoint and may become occluded by the physical frame of the display itself depending on the number of contributing illumination sources. By contrast, as planes move toward the viewer on planar displays with traditional waveguide array designs, the planes tend to shrink with the frustum of the viewpoint but are viewable from all angles at the specified location as long as the viewer is at an angle presenting energy to the eye and the virtual plane does not move beyond the angle created between the viewer and the far edge of the active display area.

Optimized Ordered Geometries for Ordered Energy Localization

Several different waveguide geometries have been illustrated thus far. One aspect of the present disclosure is that any arrangement or geometry of waveguides may be leveraged in a waveguide array. However, the waveguide geometry may have a significant impact on the energy propagation properties of the materials. In an embodiment, certain geometries, known as convex uniform tilings, may provide advantageous distributions of waveguide lenslets by arranging the lenslets in efficient configurations.

In general, a tiling or tessellation is an arrangement of geometric shapes where there is substantially no overlap between the shapes and there are no gaps or empty spaces between the shapes. A tessellation can arranged on a 2-dimensional surface using planar shapes, or in 3-dimensions using volumetric structures. Furthermore, there exist subtypes within the domain of tiling. A regular tiling, for example, is a tessellation wherein each tile is the same shape. There are many non-regular tilings comprising a set of two or more shapes configured to tessellate with one another according. There are also non-periodic tilings which have no repeating pattern, as well as aperiodic tilings which use a set of repeating tile shapes that cannot form a repeating pattern, such as a Penrose tiling. All subtypes of tiling fall within the scope of the present disclosure. The shapes of the tiles, in two-dimensional embodiments, may be polygonal, convex, concave, curved, irregular, etc. Additionally, it should be apparent to one of ordinary skill in the art that while the definition of a tiling precludes there being gaps or space between tiles, there are real-world circumstances that sometimes cause deviation from strict definition, and that the existence of minor gaps or spaces between particular tiles should not be seen as a departure from a particular tiling or tessellation pattern. In an embodiment, interstitial regions may be included which are configured to relay energy of a second energy domain, where the tiling of waveguide arrays is configured to relay energy of a first energy domain.

Figure 44:
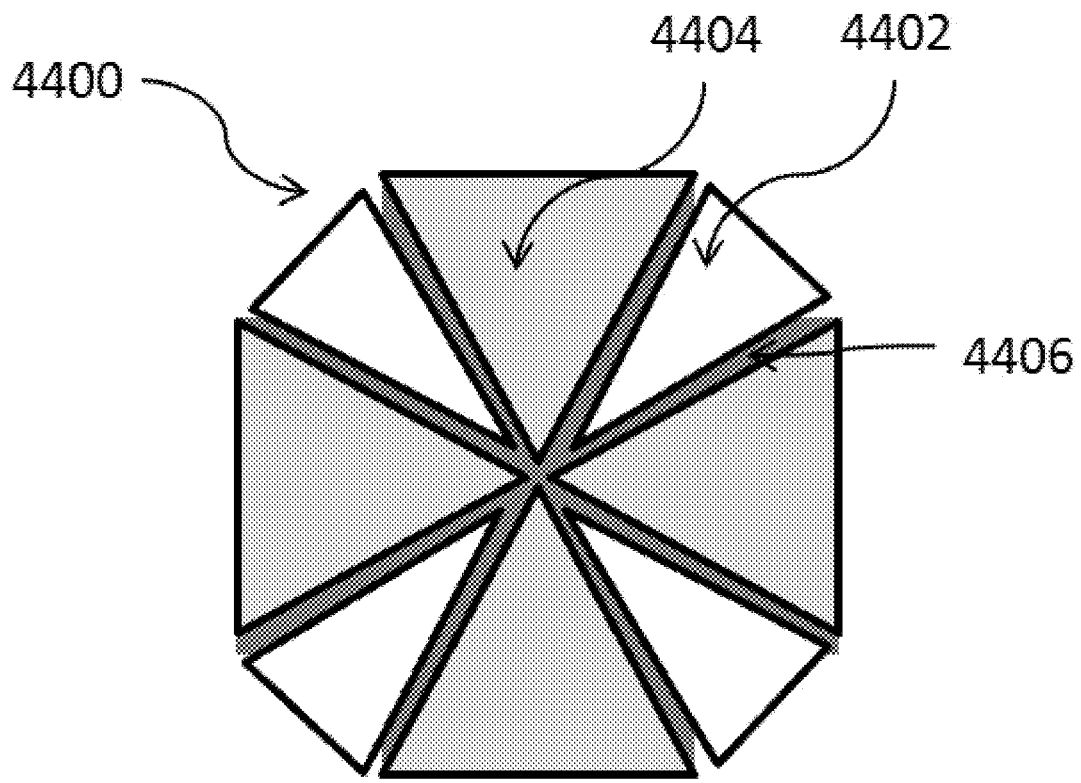
FIG. 44 illustrates a front view of an embodiment of a tiling comprising two shapes of tiles and interstitial regions located between the tiles.

In embodiments disclosed herein, there may exist interstitial regions between tiles of a tessellation of waveguides. While in general a tessellation does not comprise gaps between tiles, in some embodiment it may be preferable to insert a material in interstitial regions between tiles, while substantially not affecting the overall pattern of the particular tessellation. In an embodiment, an energy inhibiting element may be inserted in interstitial regions between tiles. In an embodiment, a wire or other conductive material may be inserted into these interstitial regions. In an embodiment, interstitial regions between tiles of a tessellation may be left intentionally absent of material or may be voided of material as determined by the intended function of the energy directing system. Voided interstitial regions may be used, for example, as channels to direct mechanical energy in the form of sound waves. FIG. 44 illustrates a front view of an embodiment of a tiling 4400 comprising a set of two shapes of tiles 4402 and 4404 and interstitial regions 4406 located between the tiles.

For the relays of certain energy domains, there may also exist a desirability to use air as a CES energy transport material, which may be incorporated into a tiling pattern as disclosed herein. Therefore, the existence of air or empty space between other types of CES tiles may be an intentional gap by design, and may be a continuation of the tessellation in particular embodiments.

A tessellation may also be performed in higher dimensions, such as 3-dimensional space. The same principles disclosed above apply to these tessellations.

The Laves tilings, for example, have vertices at the centers of the regular polygons, and edges connecting centers of regular polygons that share an edge. The tiles of the Laves tilings are called planigons including 3 regular tiles (triangle, square and pentagon) and 8 irregular ones. Each vertex has edges evenly spaced around it. Three dimensional analogues of the planigons are called stereohedrons.

All reflectional forms can be made by Wythoff constructions, represented by Wythoff symbols, or Coxeter-Dynkin diagrams, each operating upon one of three Schwarz triangles (4,4,2), (6,3,2), or (3,3,3), with symmetry represented by Coxeter groups: [4,4], [6,3], or [3[3]]. Only one uniform tiling can't be constructed by a Wythoff process, but can be made by an elongation of the triangular tiling. An orthogonal mirror construction [∞,2,∞] also exists, seen as two sets of parallel mirrors making a rectangular fundamental domain. If the domain is square, this symmetry can be doubled by a diagonal mirror into the [4,4] family. We disclose the geometries that may be leveraged.

A percolation model is to take a regular lattice, like a square lattice, and make it into a random network by randomly "occupying" sites (vertices) or bonds (edges) with a statistically independent probability p. At a threshold $p_c$, large structures and long-range connectivity first appears, and this is called the percolation threshold. Depending on the method for obtaining the random network, one distinguishes between the site percolation threshold and the bond percolation threshold. More general systems have several probabilities $p_1$, $p_2$, etc., and the transition is characterized by a surface or manifold. One can also consider continuum systems, such as overlapping disks and spheres placed randomly, or the negative space.

When the occupation of a site or bond is completely random, this is the so-called Bernoulli percolation. For a continuum system, random occupancy corresponds to the points being placed by a Poisson process. Further variations involve correlated percolation, such as percolation structures related to Ising and Potts models of ferromagnets, in which the bonds are put down by the Fortuin-Kasteleyn method. In bootstrap or k-sat percolation, sites and/or bonds are first occupied and then successively culled from a system if a site does not have at least k neighbors. Another important model of percolation, in a different universality class altogether, is directed percolation, where connectivity along a bond depends upon the direction of the flow.

Simply, duality in two dimensions implies that all fully triangulated lattices (e.g., the triangular, union jack, cross dual, martini dual and asanoha or 3-12 dual, and the Delaunay triangulation) all have site thresholds of ½, and self-dual lattices (square, martini-B) have bond thresholds of ½.

Leveraging tiled structures may have the result of altering the respective holographic pixel aspect ratio, while providing variation in field of view spatially and/or volumetrically.

Reduction in moiré or repeating patterns may also provide increased effective resolution and simultaneously provides higher potential levels of accuracy (increase in depth of field) by virtue of the various convergence locations that may be addressed. Increased efficiency of resolution may also be achieved by packing more effective resolution in potential dimensions that are more ideal for applications by not necessarily leveraging a repeating single orientation or pattern.

In an embodiment, each waveguide of an array of waveguides may comprise a shape from a set of one or more shapes, where the set of one or more shapes are configured to tessellate according to the principles of tiling disclosed herein, the tiling extending across the transverse plane of the array of waveguides. The array of waveguides may extend across a planar surface or a curved surface. In an embodiment, a tiling may comprise three-dimensionally curved shapes configured to tessellate across a curved or sloped surface. In an embodiment, the cross-sectional shape of a waveguide may comprise the projection of that shape in the transverse plane of the waveguide. In an embodiment, a waveguide may comprise a lenslet, the lenslet comprising a shape configured to tessellate. In an embodiment, a lenslet may be configured to alter a direction of energy propagating through the lenslet, the direction being determined by an energy location of the energy. In an embodiment, a waveguide may be configured to have certain properties including a dimension, a shape, an f-number, a numerical aperture, a field of view, or a focal length, the value of the properties selected for based on the desired application of the waveguide. In an embodiment, an energy domain may comprise one or more of the following properties: energy types, energy wavelength ranges, numerical apertures, or angular distribution of energy.

Several embodiments of patterns that represent the spatial packing of energy waveguide lenslets in the plane transverse to the longitudinal direction of energy wave propagation, which direct energy according to holographic propagation, are illustrated in FIG. 15-FIG. 43G. While different colors are illustrated in FIG. 15-FIG. 43G in order to differentiate the areas of adjacent waveguides, the colors do not correspond to any other properties of the waveguides, other than cross-sectional shape in the transverse plane.

Figure 15:
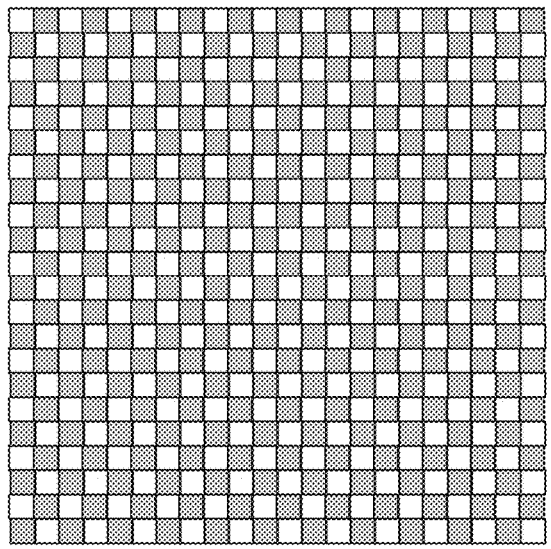
FIG. 15-FIG. 43G illustrate various front perspective views of tiling configurations for arranging energy relay materials into non-random patterns.

FIG. 15 illustrates a cutaway view in the transverse plane of a convex uniform tiling of waveguide lenslets comprising one shape. The specific tiling shown in FIG. 15 is a square tiling (or quadrille tiling).

Figure 16:
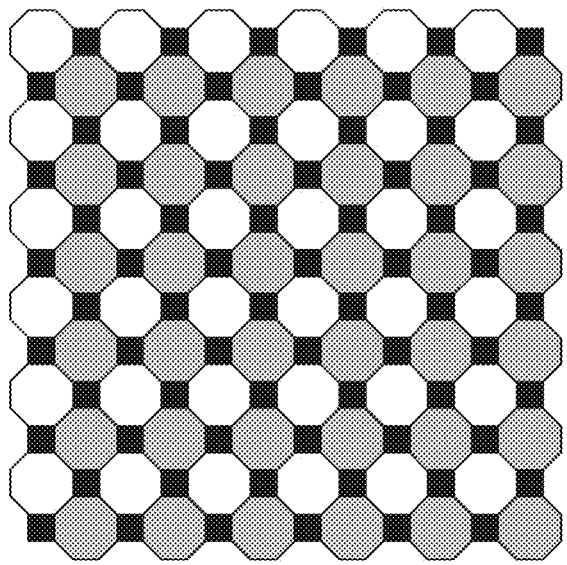

FIG. 16 illustrates a cutaway view in the transverse plane of a convex uniform tiling of waveguide lenslets comprising two shapes. The specific tiling shown in FIG. 16 is a truncated square tiling (or truncated quadrille).

Figure 17:
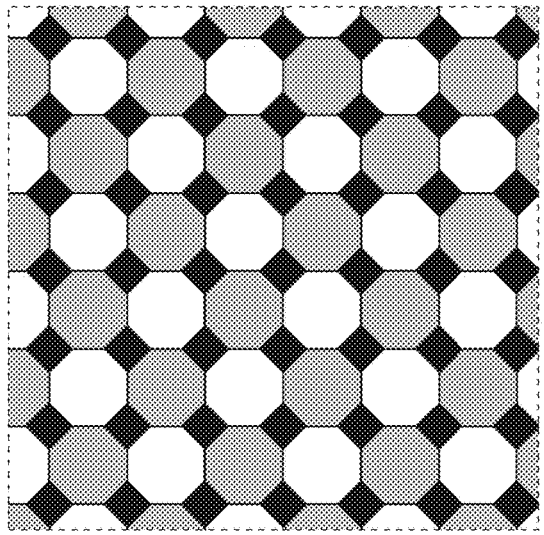

FIG. 17 illustrates a cutaway view in the transverse plane of a convex uniform tiling of waveguide lenslets comprising two shapes. The specific tiling shown in FIG. 17 is a modified version of a truncated square tiling.

Figure 18:
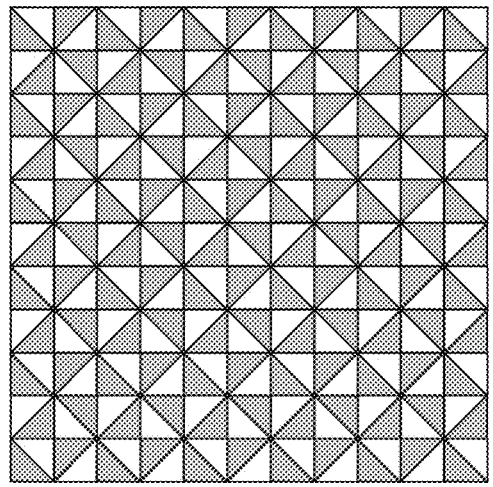

FIG. 18 illustrates a cutaway view in the transverse plane of a convex uniform tiling of waveguide lenslets comprising the same shape. The specific tiling shown in FIG. 18 is a Tetrakis square tiling (kisquadrille).

Figure 19:
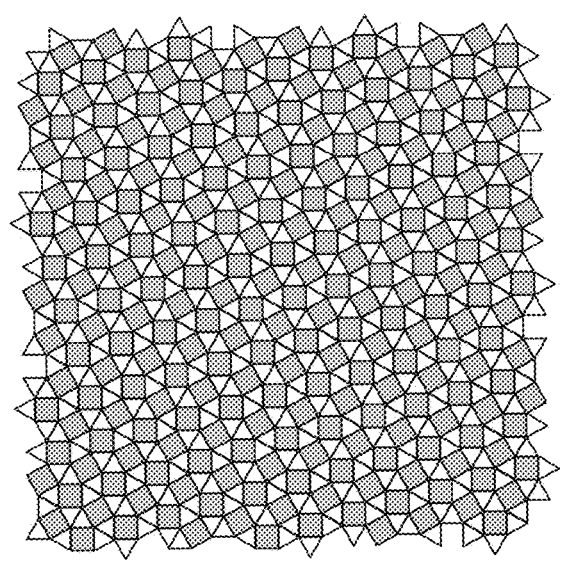

FIG. 19 illustrates a cutaway view in the transverse plane of a convex uniform tiling of waveguide lenslets comprising two shapes. The specific tiling shown in FIG. 19 is a snub square tiling (snub quadrille).

Figure 20:
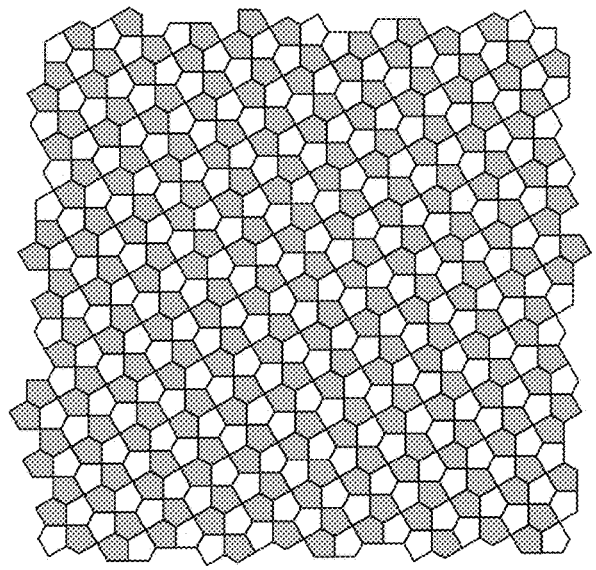

FIG. 20 illustrates a cutaway view in the transverse plane of a convex uniform tiling of waveguide lenslets comprising the same shape. The specific tiling shown in FIG. 20 is a Cairo pentagonal tiling (4-fold pentille).

Figure 21:
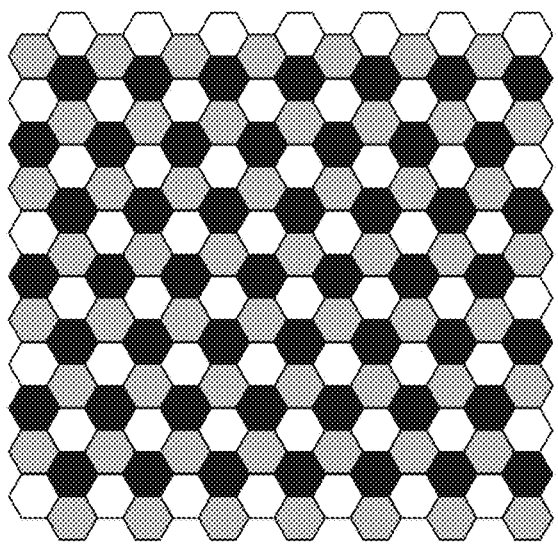

FIG. 21 illustrates a cutaway view in the transverse plane of a convex uniform tiling of waveguide lenslets comprising the same shape. The specific tiling shown in FIG. 21 is a hexagonal tiling (hextille).

Figure 22:
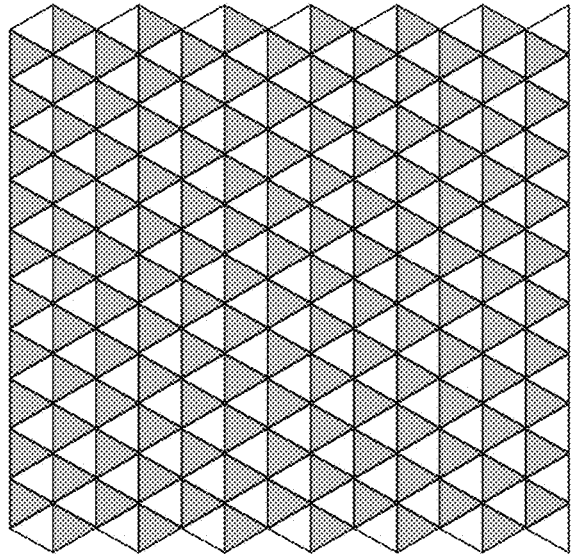

FIG. 22 illustrates a cutaway view in the transverse plane of a convex uniform tiling of waveguide lenslets comprising the same shape. The specific tiling shown in FIG. 22 is a triangular tiling (deltille).

Figure 23:
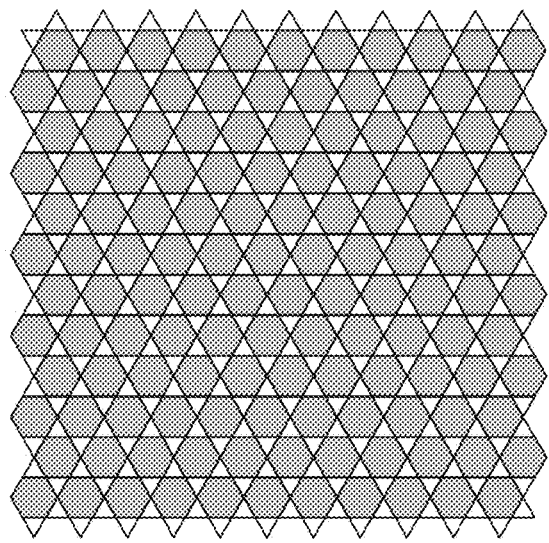

FIG. 23 illustrates a cutaway view in the transverse plane of a convex uniform tiling of waveguide lenslets comprising two shapes. The specific tiling shown in FIG. 23 is a trihexagonal tiling (hexadeltille).

Figure 24:
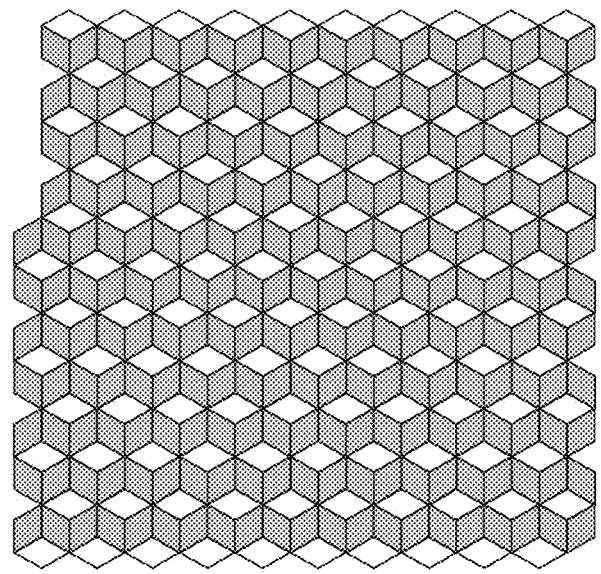

FIG. 24 illustrates a cutaway view in the transverse plane of a convex uniform tiling of waveguide lenslets comprising the same shape. The specific tiling shown in FIG. 24 is a rhombille tiling (rhombille).

Figure 25:
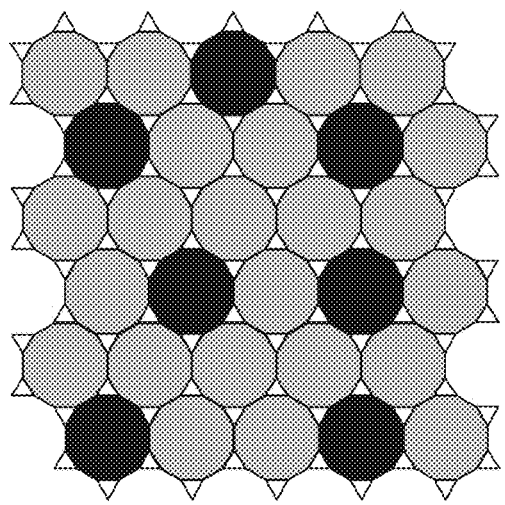

FIG. 25 illustrates a cutaway view in the transverse plane of a convex uniform tiling of waveguide lenslets comprising two shapes. The specific tiling shown in FIG. 25 is a truncated hexagonal tiling (truncated hextille).

Figure 26:
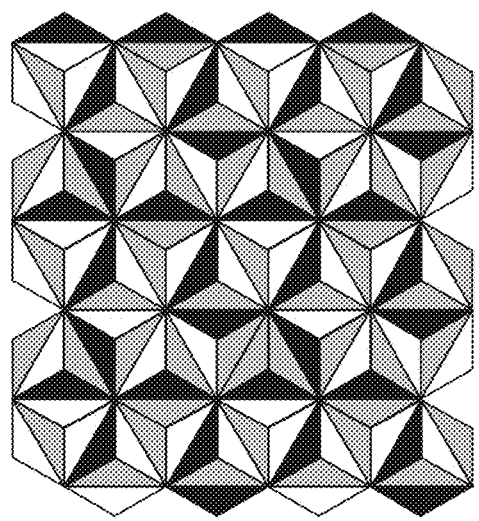

FIG. 26 illustrates a cutaway view in the transverse plane of a convex uniform tiling of waveguide lenslets comprising the same shape. The specific tiling shown in FIG. 26 is a triakis triangular tiling (kisdeltille).

Figure 27:
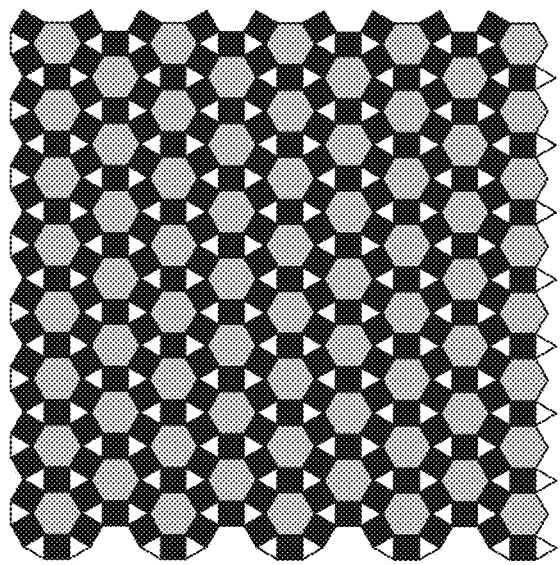

FIG. 27 illustrates a cutaway view in the transverse plane of a convex uniform tiling of waveguide lenslets comprising three shapes. The specific tiling shown in FIG. 27 is a rhombitrihexagonal tiling (rhombihexadeltille).

Figure 28:
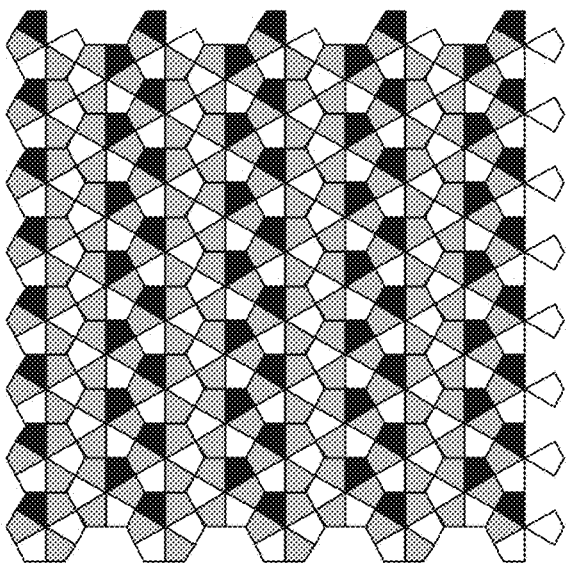

FIG. 28 illustrates a cutaway view in the transverse plane of aconvex uniform tiling of waveguide lenslets comprising the same shape. The specific tiling shown in FIG. 28 is a deltoidal trihexagonal tiling (tetrille).

Figure 29:
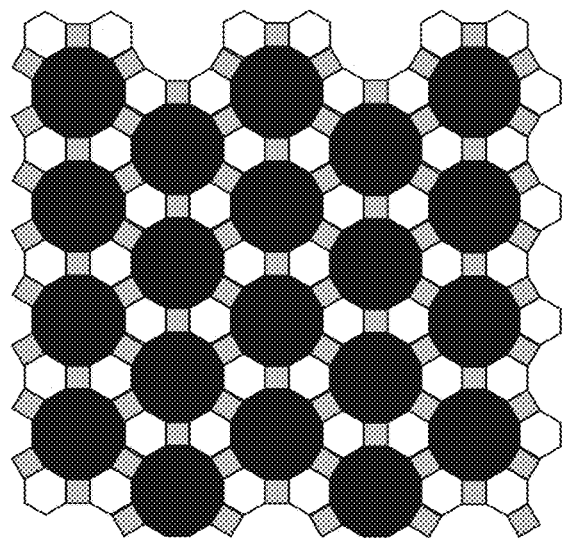

FIG. 29 illustrates a cutaway view in the transverse plane of a convex uniform tiling of waveguide lenslets comprising three shapes. The specific tiling shown in FIG. 29 is a truncated trihexagonal tiling (truncated hexadeltille).

Figure 30:
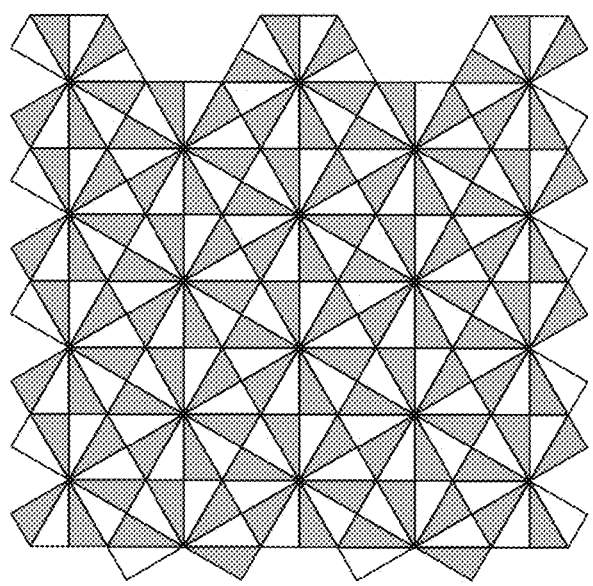

FIG. 30 illustrates a cutaway view in the transverse plane of a convex uniform tiling of waveguide lenslets comprising the same shape. The specific tiling shown in FIG. 30 is a kisrhombille tiling (kisrhombille).

Figure 31:
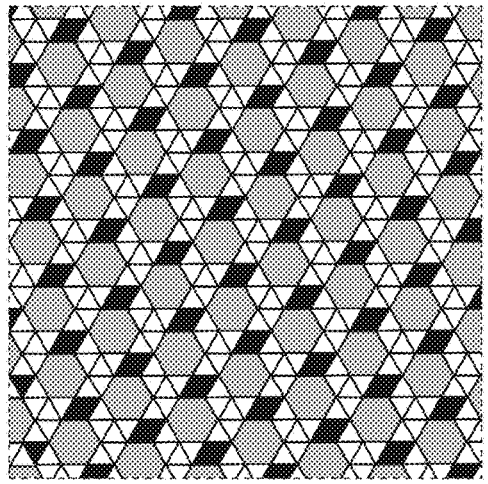

FIG. 31 illustrates a cutaway view in the transverse plane of a convex uniform tiling of waveguide lenslets comprising two shapes. The specific tiling shown in FIG. 31 is a snub trihexagonal tiling (snub hextille).

Figure 32:
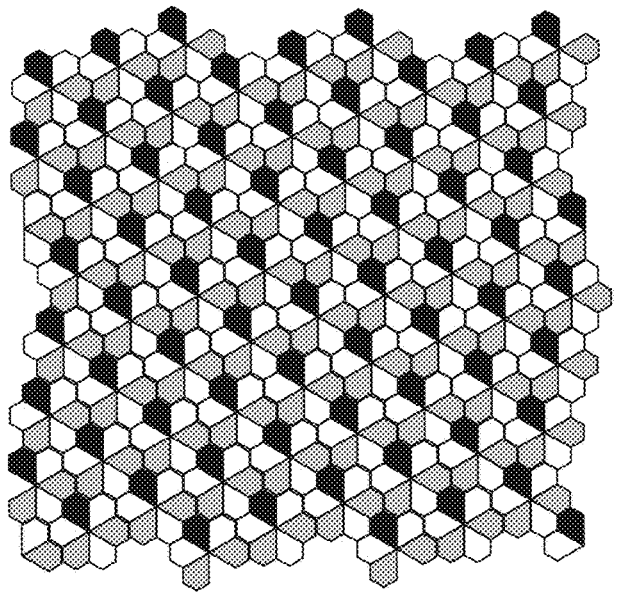

FIG. 32 illustrates a cutaway view in the transverse plane of a convex uniform tiling of waveguide lenslets comprising the same shape. The specific tiling shown in FIG. 32 is a floret pentagonal tiling (6-fold pentille).

Figure 33:
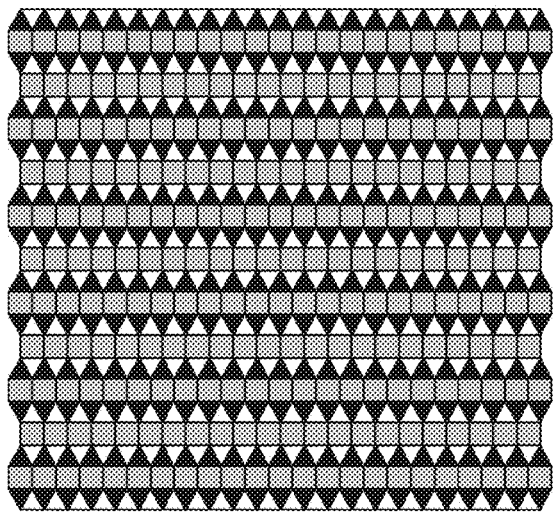

FIG. 33 illustrates a cutaway view in the transverse plane of a convex uniform tiling of waveguide lenslets comprising two shapes. The specific tiling shown in FIG. 33 is an elongated triangular tiling (isosnub quadrille).

Figure 34:
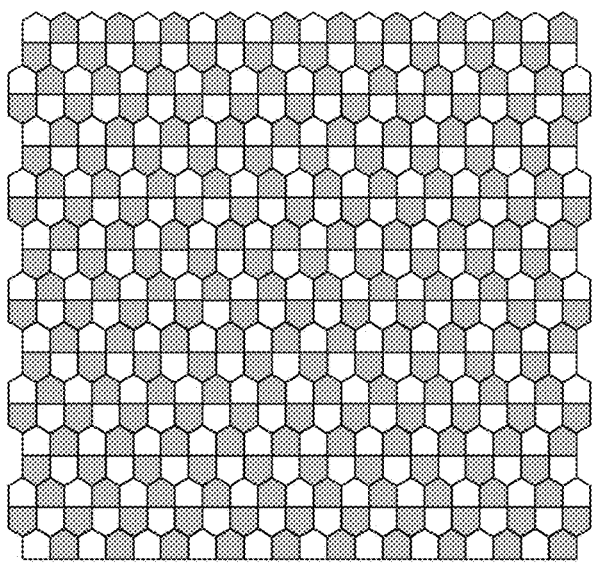

FIG. 34 illustrates a cutaway view in the transverse plane of a convex uniform tiling of waveguide lenslets comprising the same shape. The specific tiling shown in FIG. 34 is a prismatic pentagonal tiling (iso(4-)pentille).

Figure 35:
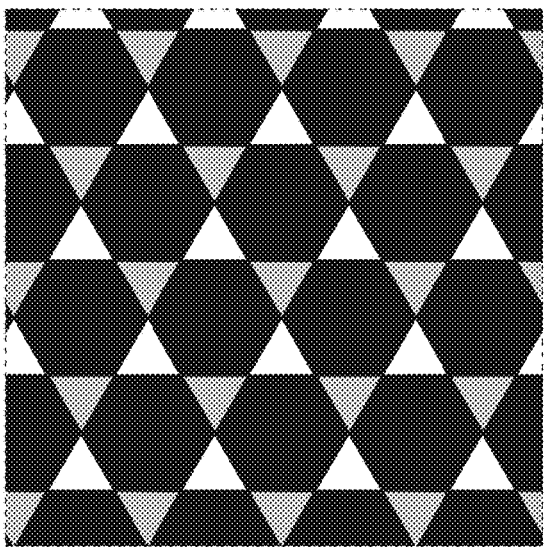

FIG. 35 illustrates a cutaway view in the transverse plane of a convex uniform tiling of waveguide lenslets comprising two shapes. The specific tiling shown in FIG. 35 is a trihexagonal tiling.

Figure 36:
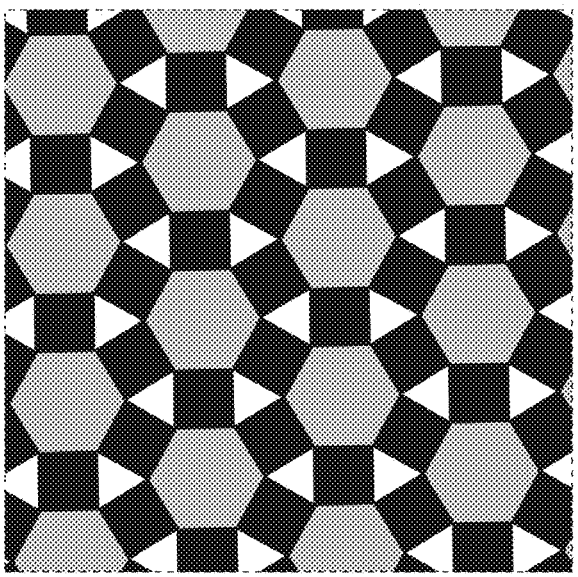

FIG. 36 illustrates a cutaway view in the transverse plane of a convex uniform tiling of waveguide lenslets comprising three shapes. The specific tiling shown in FIG. 36 is a rhombitrihexagonal tiling.

Figure 37:
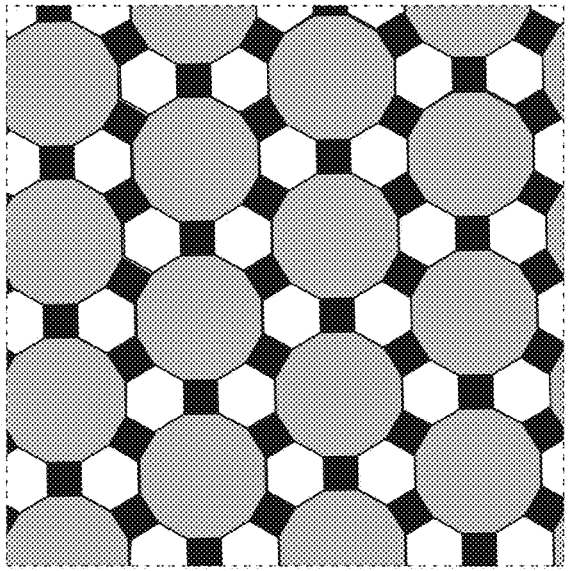

FIG. 37 illustrates a cutaway view in the transverse plane of a convex uniform tiling of waveguide lenslets comprising three shapes. The specific tiling shown in FIG. 37 is a truncated trihexagonal tiling.

Figure 38:
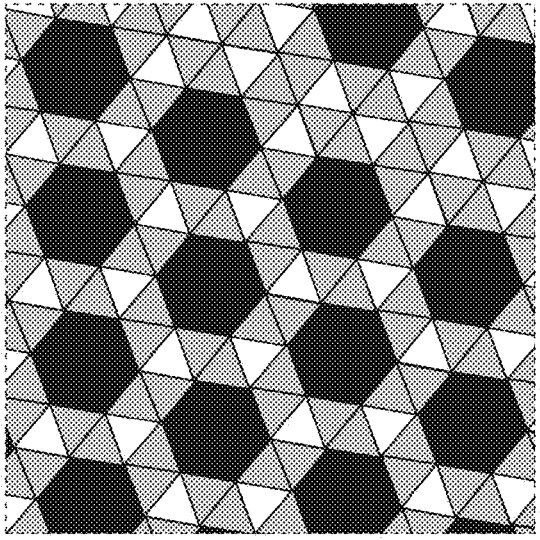

FIG. 38 illustrates a cutaway view in the transverse plane of a convex uniform tiling of waveguide lenslets comprising two shapes. The specific tiling shown in FIG. 38 is a snub hexagonal tiling.

Figure 39:
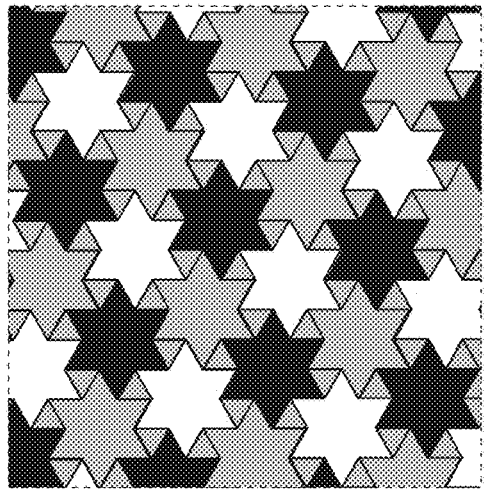

FIG. 39 illustrates a cutaway view in the transverse plane of a non-convex uniform tiling of waveguide lenslets comprising two shapes.

Figure 40:
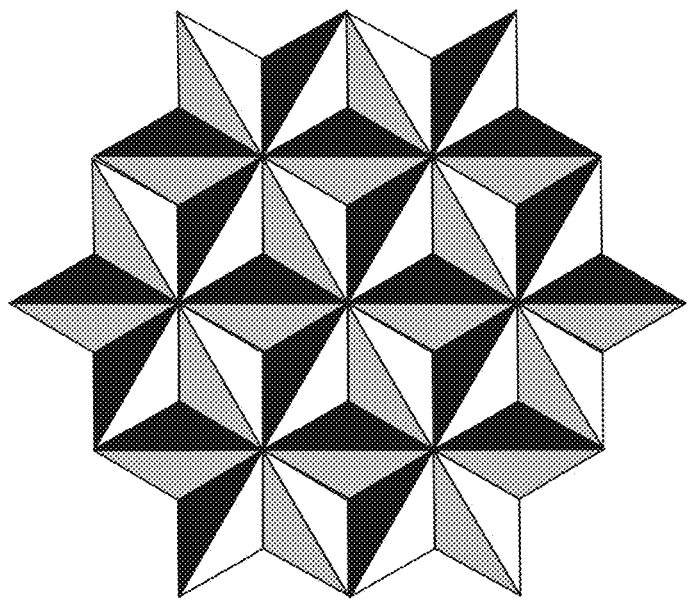

FIG. 40 illustrates a cutaway view in the transverse plane of a convex uniform tiling of waveguide lenslets comprising the same shape.

Figure 41:
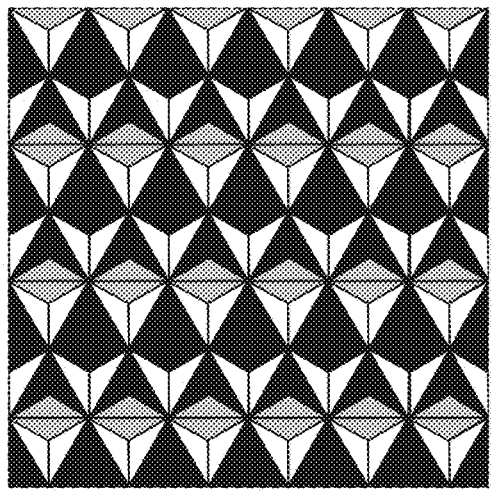

FIG. 41 illustrates a cutaway view in the transverse plane of a convex uniform tiling of waveguide lenslets comprising two shapes.

Figure 42:
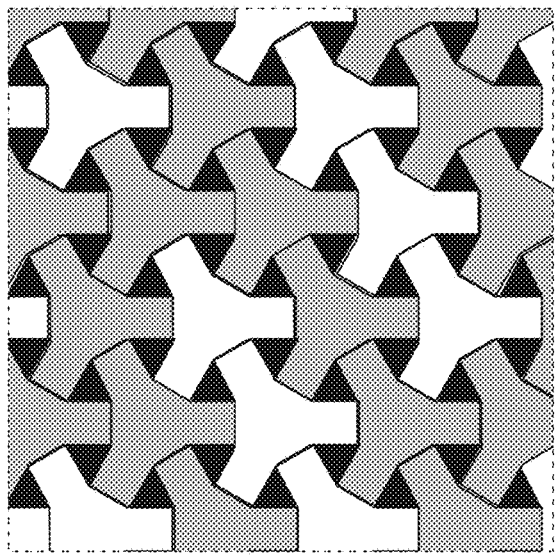
Figure 43A:
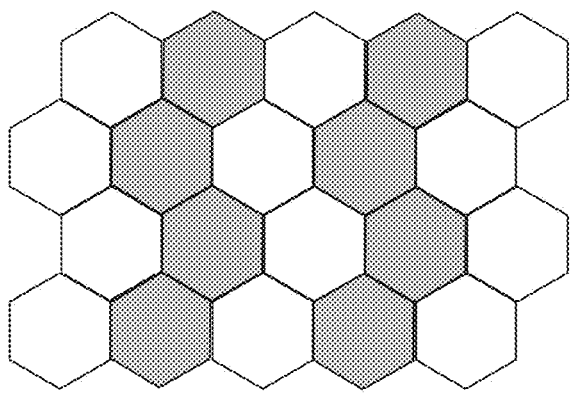
Figure 43B:
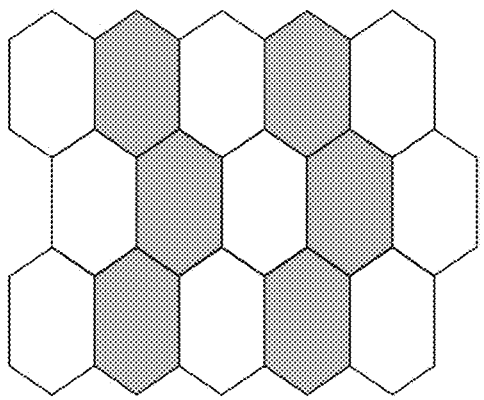
Figure 43C:
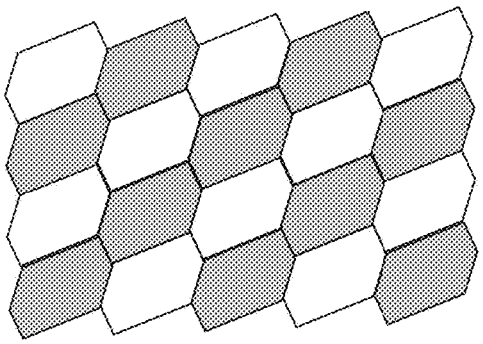
Figure 43D:
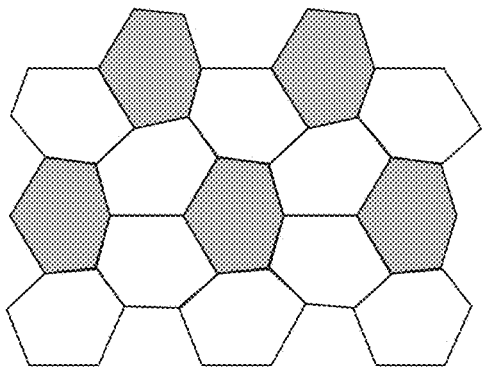
Figure 43E:
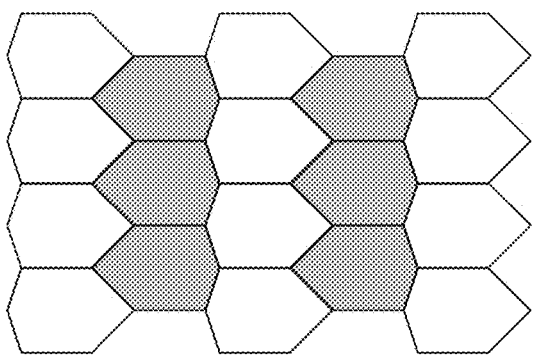
Figure 43F:
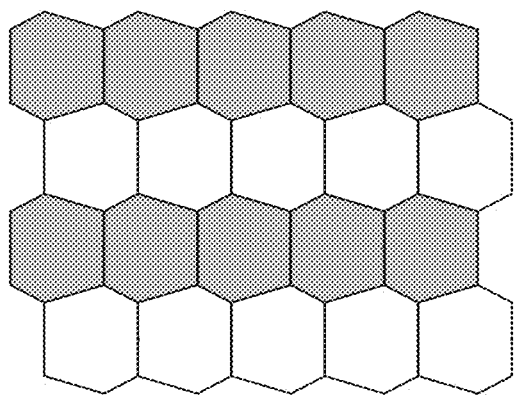
Figure 43G:
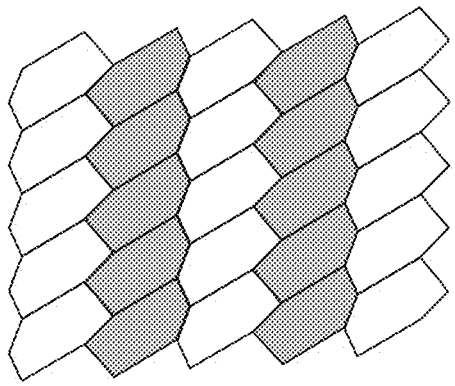

FIG. 42 illustrates a cutaway view in the transverse plane of a convex uniform tiling of waveguide lenslets comprising two shapes.

FIGS. 43A-43G illustrate cutaway views in the transverse plane of a several additional convex uniform tilings of one, two, three or more different energy relay materials.

The patterns illustrated in FIGS. 30-43G may be applied to design energy waveguide arrays that project energy from specific locations on an energy relay surface to specific angles in space. For example, in the visible electromagnetic energy spectrum, the above patterns may represent varied aperture sizes, aperture orientations, and different effective focal lengths across a lens array to yield an ordering to the projection patterns that is unachievable through typical regularly-spaced micro-lens array patterns.

The tilings shown in FIGS. 30-43G are merely exemplary, and the scope of the present disclosure should not be limited to these illustrated tilings.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a value herein that is modified by a word of approximation such as "about" or "substantially" may vary from the stated value by at least ±1, 2, 3, 4, 5, 6, 7, 10, 12 or 15%.

As used in this specification and claim(s), the words "comprising" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. An energy waveguide system for defining a plurality of energy propagation paths comprising:
    an array of energy waveguides, the array comprising a first side and a second side, and being configured to direct energy therethrough along a plurality of energy propagation paths extending through a plurality of energy locations on the first side;
        wherein a first subset of the plurality of energy propagation paths extend through a first energy location and a first energy waveguide of the array of energy waveguides, wherein the first subset of the plurality of energy propagation paths fill at least a portion of an aperture of the first energy waveguide and extend towards the second side of the array in a first direction which is determined at least by the first energy location, the first subset of the plurality of energy propagation paths comprising a chief ray path and additional paths that are substantially parallel to the chief ray path on the second side of the array; and
        wherein each waveguide of the array of waveguides comprises a shape of a set of one or more shapes configured to tessellate across a transverse plane of the energy waveguide system, the array of energy waveguides being arranged in a tiling of the one or more shapes across the transverse plane of the energy waveguide system, wherein the tiling of the energy waveguides results in the energy waveguides across the tiling operable to propagation energy differently depending on the configuration of each energy waveguide.

2. The energy waveguide system of claim 1, wherein there are substantially no empty spaces between the energy waveguides of the array of energy waveguides.

3. The energy waveguide system of claim 1, wherein energy directed along the first energy propagation path through the first energy waveguide substantially fills a first aperture of the first energy waveguide; and
    the energy waveguide system further comprising an energy inhibiting element positioned to limit propagation of energy along a portion of the first subset of the plurality of energy propagation paths that do not extend through the first aperture;
    wherein a first portion of the plurality of energy propagation paths extend through a first region, and a second portion of the plurality of energy propagation paths extend through a second region, the first and second regions separated by the energy inhibiting element, and wherein the first and second portions of energy propagation paths intersect at the second side of the array.

4. The energy waveguide system of claim 3, wherein the energy inhibiting element is located on the first side between the array of energy waveguides and the plurality of energy locations.

5. The energy waveguide system of claim 3, wherein the first energy waveguide comprises a two-dimensional spatial coordinate, and wherein the unique direction determined at least by the first energy location comprises a two-dimensional angular coordinate, whereby the 2D spatial coordinate and the 2D angular coordinate form a four-dimensional (4D) coordinate set.

6. The energy waveguide system of claim 5, wherein energy directed along the first energy propagation path comprises one or more energy rays directed through the first energy waveguide in a direction that is substantially parallel to the first chief ray.

7. The energy waveguide system of claim 3, wherein energy directed along the first energy propagation path converges with energy directed along a second energy propagation path through a second energy waveguide.

8. The energy waveguide system of claim 7, wherein the first and second energy propagation paths converge at a location on the first side of the array, on the second side of the array, or between the first and second sides of the array.

9. The energy waveguide system of claim 3, wherein each energy waveguide comprises a structure for directing energy, the structure selected from a group consisting of:
    a structure configured to alter an angular direction of energy passing therethrough;
    a structure comprising at least one numerical aperture;
    a structure configured to redirect energy off at least one internal surface; and
    an energy relay.

10. The energy waveguide system of claim 3, wherein the energy inhibiting element comprises a structure for attenuating or modifying energy propagation paths, the structure selected from a group consisting of:
    an energy blocking structure;
    an element configured to alter a first energy propagation path to alter a fill factor of the first aperture; and
    a structure configured to limit an angular extent of energy proximate the first energy location.

11. The energy waveguide system of claim 10, wherein, when the energy inhibiting element is configured to limit an angular extent of energy proximate the first energy location.

12. The energy waveguide system of claim 10, wherein the energy inhibiting structure comprises at least one numerical aperture or a baffle structure.

13. The energy waveguide system of claim 10, wherein the energy inhibiting structure is positioned adjacent to the first energy waveguide and generally extends towards the first energy location or adjacent to the first energy location and generally extends towards the first energy waveguide.

14. The energy waveguide system of claim 1, wherein each waveguide of the array of waveguides comprises a cross-sectional shape of a set of one or more shapes along the transverse plane of the energy waveguide system, the one or more shapes configured to form the tiling across the transverse plane of the energy waveguide system.

15. The energy waveguide system of claim 1, wherein the array of energy waveguides are arranged to form a planar surface or a curved surface.

16. The energy waveguide system of claim 1, wherein energy directed along the first energy propagation path is electromagnetic energy defined by a wavelength, the wavelength belonging to a regime selected from a group consisting of:
    visible light;
    ultraviolet;
    infrared; and
    x-ray.

17. The energy waveguide system of claim 1, wherein energy directed along the first energy propagation path is mechanical energy defined by pressure waves, the pressure waves comprising:
- tactile pressure waves; or
- acoustic sound vibrations.

18. The energy waveguide system of claim 1, wherein the array of waveguides comprises an array of lenslets disposed side-by-side in an arrangement selected from a group consisting of:
- a hexagonal packing arrangement;
- a square packing arrangement; and
- a non-regular packing arrangement.

19. The energy waveguide system of claim 1, wherein the array of waveguides comprises an array of lenslets, the array of lenslets comprising Fresnel lenses.

20. The energy waveguide system of claim 1, wherein the array of waveguides comprises an array of lenslets, and wherein a shape of a first lenslet of the array of lenslets is configured to additionally alter the unique direction which is determined at least by the first energy location.

21. The energy waveguide system of claim 1, wherein the energy waveguide system further comprises interstitial regions between tiles of the tiling of the array of waveguides.

22. The energy waveguide system of claim 21, wherein the interstitial regions are configured to inhibit energy propagation in at least the transverse plane of the energy waveguide system.

23. The energy waveguide system of claim 21, wherein the array of waveguides are configured to direct energy of a first energy domain, and the interstitial regions are configured to direct energy of a second energy domain, different than the first energy domain.

24. The energy waveguide system of claim 21, wherein the interstitial regions comprise an absence of material.

25. The energy waveguide system of claim 1, wherein the array of waveguides comprises two or more sets of waveguides, a first set of the two or more sets of waveguides configured to direct energy of a first energy domain, and a second set of the two or more sets of waveguides configured to direct energy of a second energy domain.

26. The energy waveguide system of claim 25, wherein the first and second energy domains comprise one or more of the following properties: first and second energy types, first and second energy wavelength ranges, first and second numerical apertures, and first and second angular distributions of energy, respectively.

27. An energy waveguide system for defining a plurality of energy propagation paths comprising:
- an array of energy waveguides, the array comprising a first side and a second side, and being configured to direct energy therethrough along a plurality of energy propagation paths extending through a plurality of energy locations on the first side;
    - wherein a first subset of the plurality of energy propagation paths extend through a first energy location and a first energy waveguide of the array of energy waveguides, wherein the first subset of the plurality of energy propagation paths fill at least a portion of an aperture of the first energy waveguide and extend towards the second side of the array in a first direction which is determined at least by the first energy location, the first subset of the plurality of energy propagation paths comprising a chief ray path and additional paths that are substantially parallel to the chief ray path on the second side of the array; and
- wherein each waveguide of the array of waveguides comprises a shape of a set of one or more shapes configured to tessellate across a transverse plane of the energy waveguide system, the array of energy waveguides being arranged in a tiling of the one or more shapes across the transverse plane of the energy waveguide system.

* * * * *